(12) United States Patent
Takemoto et al.

(10) Patent No.: US 7,016,183 B2
(45) Date of Patent: Mar. 21, 2006

(54) ELECTRONIC APPLIANCE

(75) Inventors: Yoshikazu Takemoto, Tenri (JP); Katsuharu Nagai, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 86 days.

(21) Appl. No.: 10/668,265

(22) Filed: Sep. 24, 2003

(65) Prior Publication Data

US 2004/0061999 A1 Apr. 1, 2004

(30) Foreign Application Priority Data

| Sep. 25, 2002 | (JP) | ............................. 2002-278568 |
| Sep. 26, 2002 | (JP) | ............................. 2002-281090 |
| Dec. 4, 2002 | (JP) | ............................. 2002-351974 |
| Dec. 4, 2002 | (JP) | ............................. 2002-352121 |

(51) Int. Cl.
*G06F 1/16* (2006.01)
(52) U.S. Cl. .................. 361/683; 312/223.2; 400/691; 341/22
(58) Field of Classification Search ........ 361/680–687, 361/724–727; 312/223.1–223.6; 348/220; 345/156–157; 364/708.1; 341/22; 400/489, 400/691–693
See application file for complete search history.

(56) References Cited

U.S. PATENT DOCUMENTS

| 6,275,376 B1 * | 8/2001 | Moon .......................... 361/683 |
| 6,680,845 B1 * | 1/2004 | Agata et al. ................. 361/683 |

FOREIGN PATENT DOCUMENTS

| JP | 10-290084 A | 10/1998 |
| JP | 2000-165719 A | 6/2000 |
| JP | 2001-268613 A | 9/2001 |

* cited by examiner

*Primary Examiner*—Hung Van Duong
(74) *Attorney, Agent, or Firm*—Birch, Stewart, Kolasch & Birch, LLP

(57) ABSTRACT

An electronic appliance includes a first casing having an input portion, a second casing having a screen display portion on one face thereof, a coupling, and a controller portion for controlling screen display on the screen display portion. The first and second casings are coupled together such that the electronic appliance can be moved between a first state, in which the second casing is unfolded relative to the first casing with the screen display portion pointing in the direction of the input portion, and a second state, in which the second casing is folded over the first casing with the face of the second casing opposite to the screen display portion facing the face of the first casing on which the input portion is provided. When the appliance changes between the first and second states, the controller portion rotates the screen display by 90° between the first and second states.

31 Claims, 24 Drawing Sheets

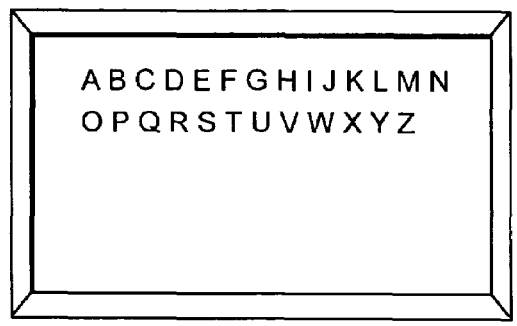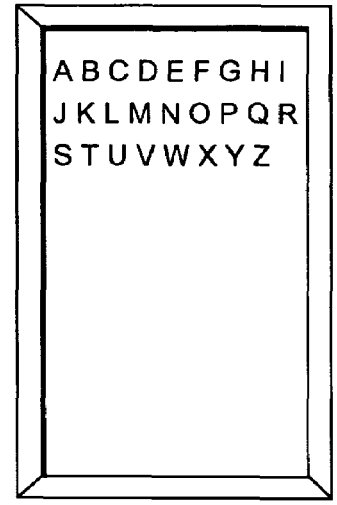
FIG.6A                    FIG.6B
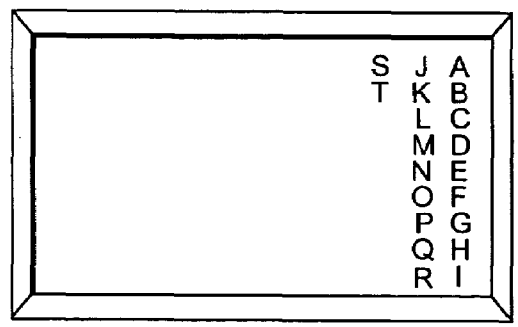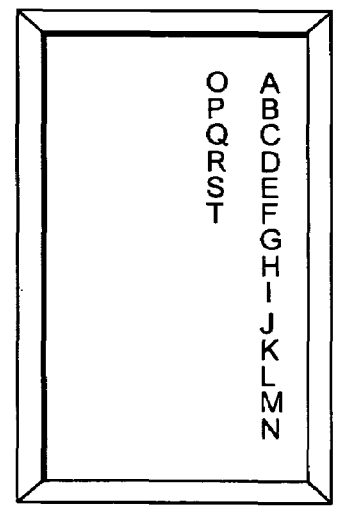
FIG.6C                    FIG.6D

FIG.7

PERMIT ROTATION OF THE SCREEN?

☐ ROTATE THE SCREEN BY 90° IN PDA-LIKE ORIENTATION

☐ DO NOT ROTATE THE SCREEN BY 90° IN PDA-LIKE ORIENTATION

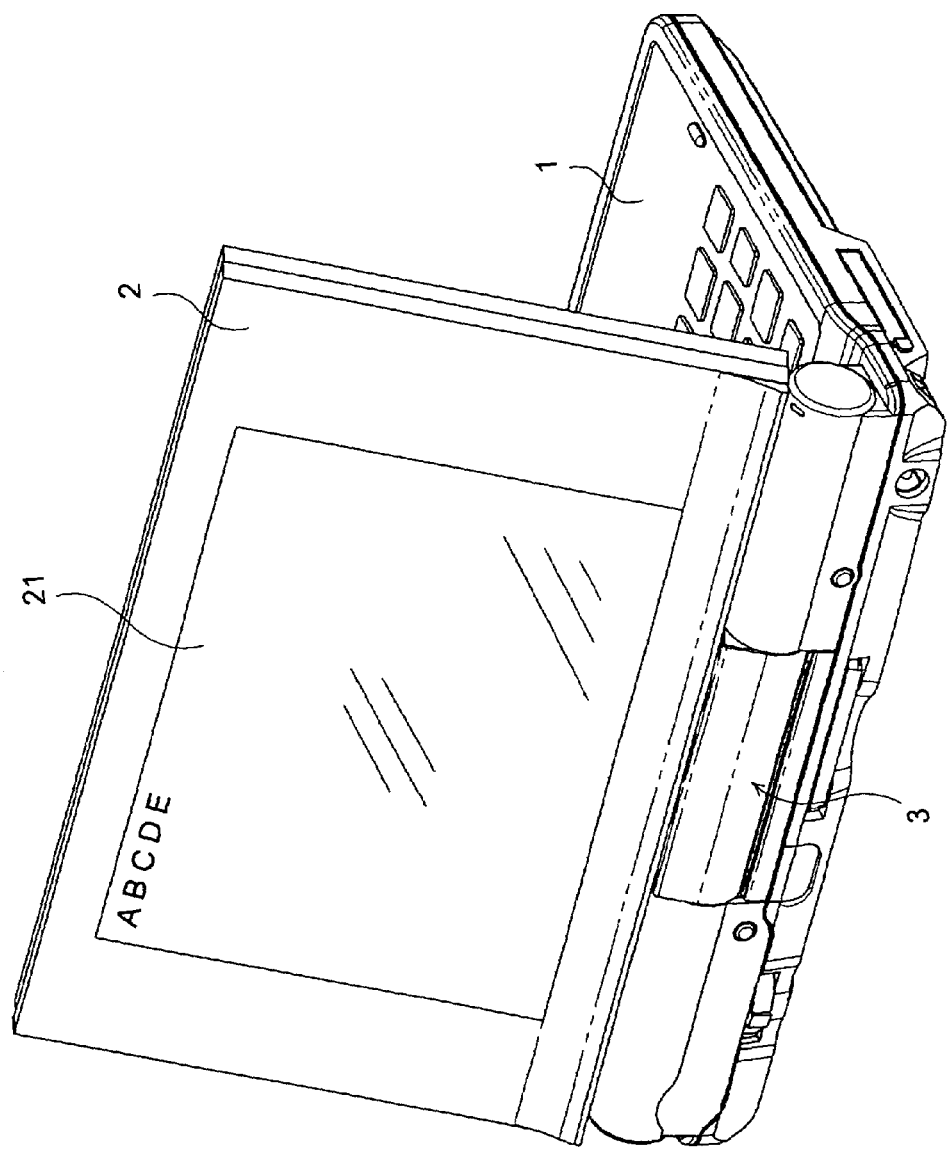

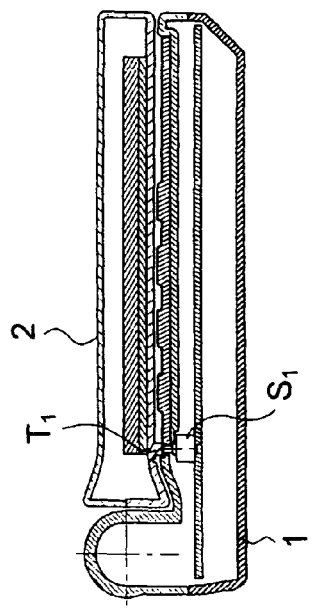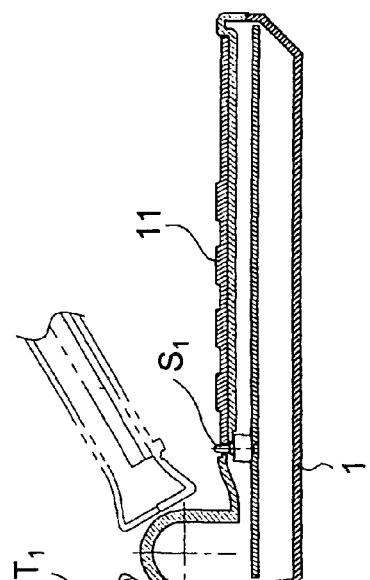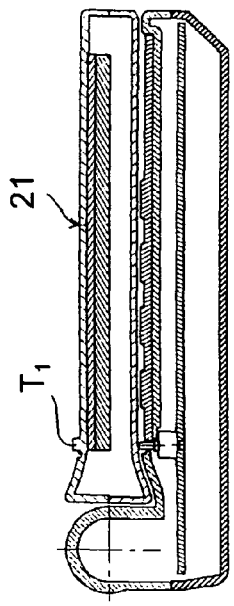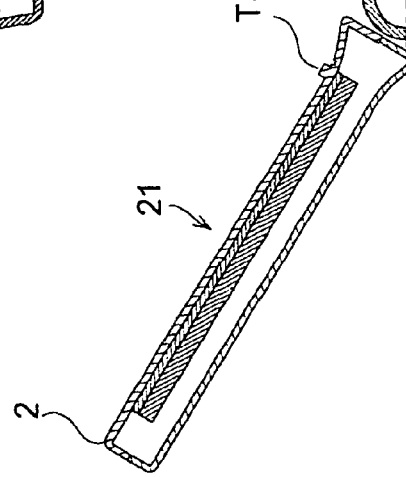
FIG.11A
FIG.11B
FIG.11C

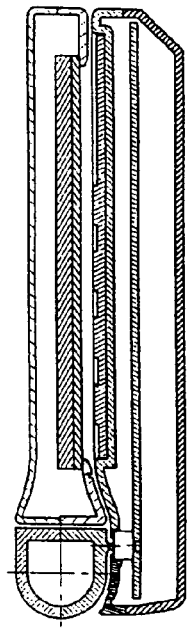
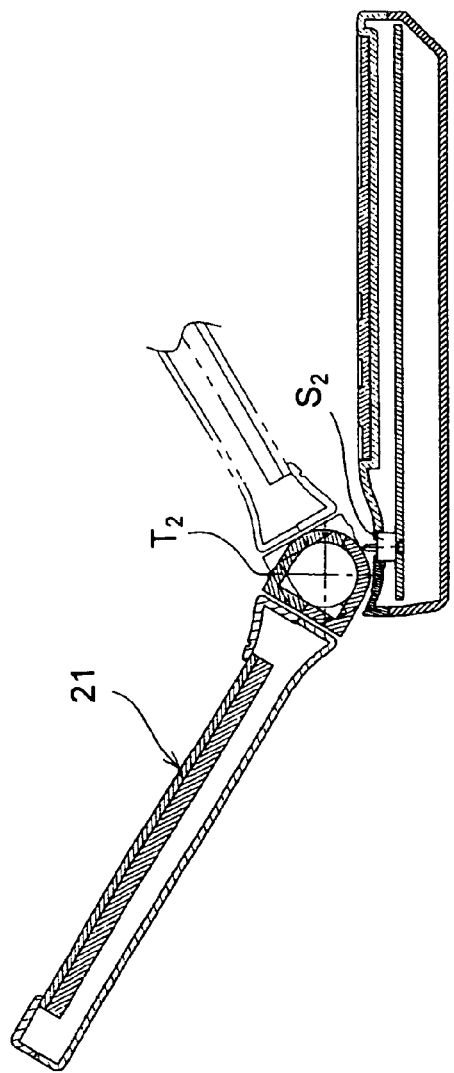
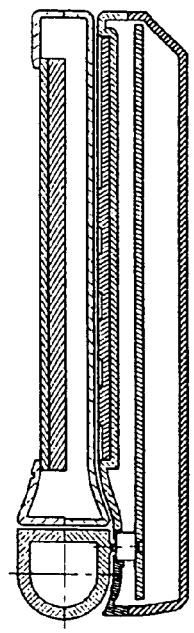
FIG.12A
FIG.12B
FIG.12C

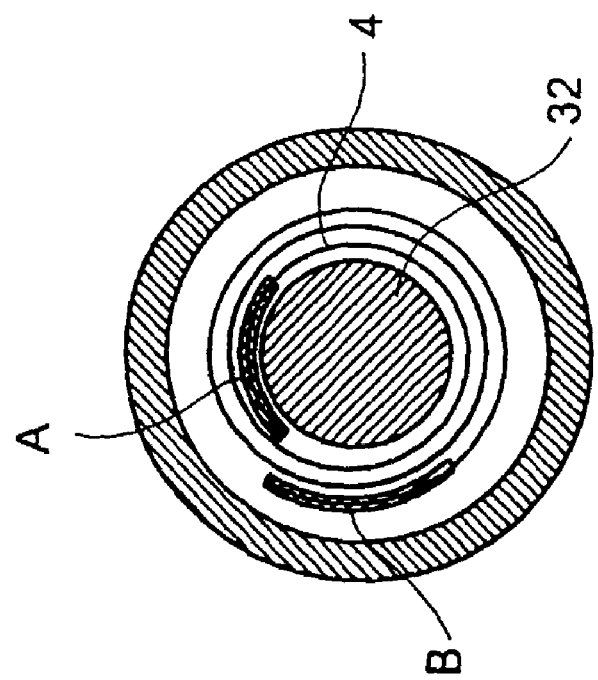
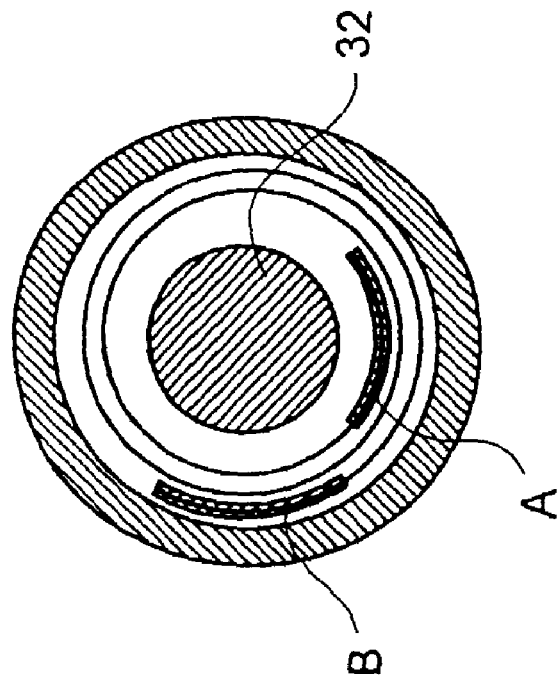
FIG.20A
FIG.20B

ELECTRONIC APPLIANCE

CROSS-REFERENCE TO RELATED APPLICATION

The present application claims priority under 35 U.S.C. §119 to Japanese Patent Application Nos. 2002-278563, filed Sep. 25, 2002; 2002-281090, filed Sep. 26, 2002; and 2002-351974 and 2002-352121, both filed Dec. 4, 2002, the entire disclosures of which are hereby incorporated by reference.

BACKGROUND OF THE INVENTION

1. Field of the Invention

The present invention relates to an electronic appliance, and more particularly to an electronic appliance having two casings coupled together by a coupling.

2. Description of the Prior Art

In electronic appliances directed to mobile data processing, such as PDAs (personal digital assistants), the compactness of the appliances themselves counts most. Accordingly, in such appliances, compactness is achieved by providing operated members such as a jog dial and key tops, for example, around a display screen or on side faces of the appliances so that operations such as selection of or decision on a choice or message displayed on the screen (such operations will hereinafter be referred to also as "selection/decision operations") are performed by use of those operated members.

On the other hand, in recent years, it has been becoming increasingly common not only to receive data but to transmit data by use of mobile data processing appliances. In conventional appliances, input of characters is achieved either by selecting and inputting one character after another by selection/determination operations as mentioned above or by inputting characters via a display screen having a transparent touch panel fitted thereto by use of a pen. In either way, it takes time and trouble to input characters. Characters can easily be input by use of a keyboard, but, where appliances need to be compact, it is not possible to secure on a surface of the appliances an ample area to provide a keyboard in. This inevitably results in small keys and a narrow key-to-key pitch, and thus makes it difficult for the user to input characters by use of those keys.

To overcome this problem, Japanese Patent Application Laid-Open No. 2001-268613 proposes building a data processing appliance with an upper half portion and a lower half portion so that, when input is performed by use of a keyboard portion, the upper and lower half portions are unfolded and, when input is performed by selection/determination operations, the upper and lower half portions are folded together.

In general, where input is performed by use of a keyboard, an appliance that is laterally elongate is preferable from the viewpoints of key arrangement and ease of input. Moreover, in general, the screen on which the input characters and symbols are displayed is easier to view when it is laterally elongate. By contrast, where input is performed by selection/determination operations, since such operations are performed with an appliance held in one hand, an appliance that is longitudinally elongate is preferable because it is then easier to hold on a palm and use.

However, the structure proposed in the aforementioned patent publication does not permit the appliance to be used from different directions. Thus, when the appliance is used in the laterally elongate orientation, it is easy to use the keyboard, but it is difficult to perform selection/determination operations. By contrast, when the appliance is used in the longitudinally elongate orientation, it is easy to perform selection/determination operations, but it is difficult to use the keyboard.

In an appliance as described above that has a foldable and rotatable screen display portion, one way to electrically connect the main portion to the screen display portion is to use leads. When leads are used, they are typically laid through a hollow shaft. With this wiring method, however, as the number of leads increases, the shaft needs to be made thicker. This, disadvantageously, makes the hinge mechanism as a whole unduly large.

Another way to electrically connect the main portion to the screen display portion is to use an FPC (flexible printed circuit) board. An FPC board is thin even when it has several tens of conductors, and thus its use helps make the hinge mechanism compact. On the other hand, an FPC board is made so long as to permit the folding and rotating movement of the screen display portion, and therefore, for example when the screen display portion is folded over the main portion, the margin portion of the FPC board becomes loose. When the FPC board becomes loose, it is prone to deteriorate by making frequent contact with members provided around. Moreover, to prevent the FPC board from popping out, it is necessary to secure inside an appliance a space to accommodate the loose portion of the FPC board. This makes difficult to make the appliance compact.

To overcome this inconvenience, for example, Japanese Patent Application Laid-Open No. H10-290084 discloses a technique whereby a plurality of FPC boards having different lengths are laid on one another and are wound around a hinge shaft. This helps eliminate the looseness resulting from the differences in inner diameter between the individual FPC boards when they are wound around the hinge shaft. This technique is based on the technique of winding an FPC board around a hinge shaft, which technique is effective in eliminating the looseness of the FPC board that occurs as the screen display portion is rotated.

According to the technique disclosed in the aforementioned patent publication, however, an FPC board is wound around a rotation shaft (24) but not around a folding shaft (not illustrated). In a video camera apparatus or the like, where the screen display portion can only be unfolded to 90° relative to the main portion as illustrated in the aforementioned patent publication, even if an FPC board is not wound around the folding shaft, the looseness of the FPC board when the screen display portion is folded over the main portion is considered to be negligibly small. However, in a case where the screen display portion is unfolded to, for example, over 180°, how to deal with the looseness of an FPC board when the screen display portion is folded poses a serious problem.

SUMMARY OF THE INVENTION

It is a first object of the present invention to provide an electronic appliance that permits easy input by use of a keyboard and that in addition can be held in one hand for easy operation when selection/determination operations are performed.

It is a second object of the present invention to provide an electronic appliance that has two casings coupled together by a two-axis hinge mechanism and electrically connected together by a flexible connecting member wherein even a rotation over 90° causes only a small displacement of the flexible connecting member and thus only a little looseness.

To achieve the first object, according to one aspect of the present invention, an electronic appliance is provided with a first casing having an input portion and a second casing having a screen display portion on one face thereof. Here, the first and second casings are coupled together by a coupling in such a way that the state of the electronic appliance can be selected between a first state in which the second casing is unfolded relative to the first casing with the screen display portion pointing in the direction of the input portion and a second state in which the second casing is folded over the first casing with the face of the second casing opposite to the screen display portion facing the face of the first casing on which the input portion is provided. Moreover, according to a detection signal from a detector that detects a change in the state of the electronic appliance between the first and second states, a controller portion rotates the screen display by 90° between the first and second states.

Structured as described above, this electronic appliance can be used in a laterally elongate orientation when input is performed via the input portion, such as a keyboard, and can be used in a longitudinally elongate orientation when input is performed by selection/determination operations. This electronic appliance, as compared with conventional ones, permits easy input by use of a keyboard, and in addition can be held in one hand for easy operation when selection/determination operations are performed.

To achieve the second object, according to another aspect of the present invention, in an electronic appliance, a first casing and a second casing are coupled together with a two-axis hinge mechanism having a folding shaft and a rotation shaft. Moreover, the first and second casings are electrically connected together by a flexible connecting member, with the flexible connecting member wound around the surfaces of both the folding shaft and rotation shaft.

Structured as described above, this electronic appliance operates with a minimum displacement of the flexible connecting member even when the second casing is unfolded or rotated to 180° or further to 360° relative to the first casing. This helps make the hinge mechanism, and thus the electronic appliance as a while, compact.

To achieve the second object, according to another aspect of the present invention, in an electronic appliance, a first casing and a second casing are coupled together with a two-axis hinge mechanism having a folding shaft and a rotation shaft. Moreover, the first and second casings are electrically connected together by a flexible connecting member, and at least one of the folding shaft and rotation shaft is made hollow. The flexible connecting member is formed into a coil-like shape and laid inside whichever of the folding shaft and rotation shaft is hollow, and is wound around the surface of whichever of the folding shaft and rotation shaft is not hollow.

Structured as described above, this electronic appliance, like the one described immediately before, operates with a minimum displacement of the flexible connecting member even when the second casing is unfolded or rotated to 180° or further to 360° relative to the first casing. This helps make the hinge mechanism, and thus the electronic appliance as a while, compact.

BRIEF DESCRIPTION OF THE DRAWINGS

This and other objects and features of the present invention will become clear from the following description, taken in conjunction with the preferred embodiments with reference to the accompanying drawings in which:

FIGS. 6A to 6D are diagrams showing how the display on the screen display portion changes when the state is changed from the first to the second state;

FIG. 7 is a diagram showing an example of how a setting is made in a setting screen to inhibit the screen display from being rotated;

FIG. 10 is a perspective view showing an example of how the appliance is used;

FIGS. 11A to 11C are side sectional views of the appliance, showing how the detector detects different states;

FIGS. 12A to 12C are side sectional views of the appliance, showing how the detector of another type detects different states;

FIGS. 20A and 20B are sectional views of the rotation shaft having the FPC boards wound around it as shown in FIG. 19;

DESCRIPTION OF THE PREFERRED EMBODIMENTS

To achieve the first object, the inventors of the present invention have conducted an intensive study in search of a way of, in an electronic appliance in which a first casing provided with an input portion such as a keyboard and a second casing having a screen display portion provided on one face thereof are coupled together by a coupling, permitting easy input via the input portion and simultaneously permitting selection/decision operations to be performed easily with one hand as conventionally performed. The study has led the inventors to devise the present invention on the basis of the novel idea that the aim is attained by designing the appliance to be operable from different directions between when input is performed via the input portion and when input is performed by selection/decision operations.

Specifically, consider an appliance that is rectangular in shape as seen in a plan view with its first and second casings folded together. When input is performed via an input portion such as a keyboard, the appliance is placed in a laterally elongate orientation, then the appliance is unfolded, and then input is performed via the input portion. This permits the keys themselves to be made sufficiently large, and the key-to-key pitch to be made sufficiently wide. This helps prevent erroneous input resulting from a plurality keys being pressed simultaneously. On the other hand, when input is performed by selection/decision operations, after the appliance is unfolded, the second casing is rotated by 180°, then the second casing is folded over the first casing with a screen display portion facing outward, and then the appliance as a whole is rotated by 90°, so that the appliance is used in a longitudinally elongate orientation. This permits the appliance to be held in one hand and supported securely therein. Then, as conventionally performed, input is performed by selection/decision operations achieved by operating operated members with the thumb of the hand holding the appliance, or by touch or hand-writing operations achieved by touching or scribbling on a display screen by use of a pen held in the other hand.

Hereinafter, data processing appliances embodying the invention will be described with reference to the drawings. It should be understood, however, that the examples described below are not intended to limit the present invention in any way.

Figure 1:
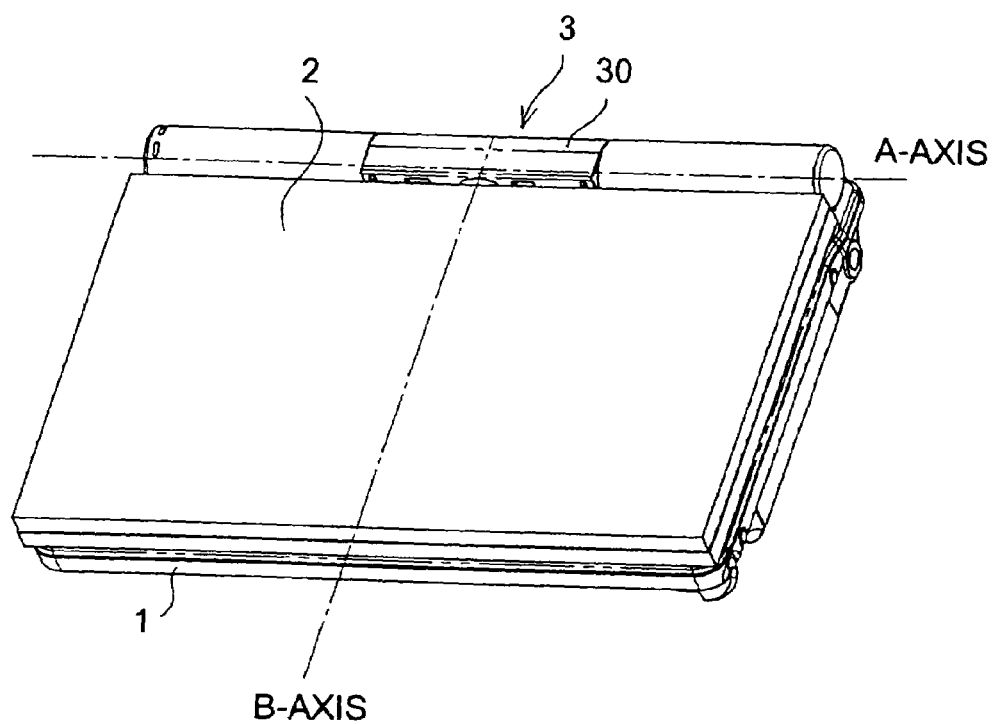
FIG. 1 is a perspective view showing an example of how a data processing appliance embodying the invention appears in the not-in-use state.
Figure 2:
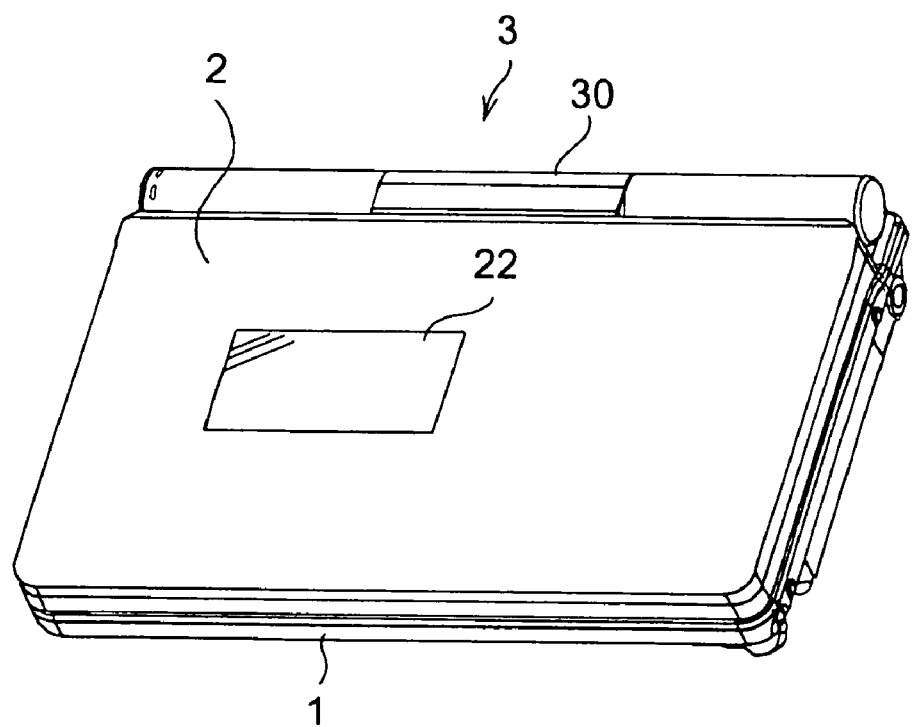
FIG. 2 is a perspective view of the appliance, in a case where a subsidiary screen display is provided on the second casing.

FIG. 1 is a perspective view showing how an appliance embodying the invention appears in the not-in-use state. Specifically, in this state, a first casing 1 and a second casing 2 are folded together by a two-axis hinge mechanism (coupling) 3 with the face of the former on which an input portion 11 (shown in FIG. 3) is provided facing the face of the latter on which a screen display portion 21 (shown in FIG. 3) is provided. By bringing the apparatus into this state, it is possible to protect the screen display portion 21 and the input portion 11 from an external force and the like. When the appliance is not being used, it is brought into this state. In the appliance shown in the figure, the coupling is realized with a two-axis hinge. However, in the invention, it is possible to use any conventionally known type of coupling other than that so long as it can switch the state of the appliance between a first and a second state. As shown in FIG. 2, a second screen display portion 22 may be additionally provided on the face of the second casing opposite to the screen display portion 21. This permits the user to obtain information such as the current time, whether there is any received message or not, and the like by viewing the second screen display portion 22 even when the appliance is in the not-in-use state. Regardless of the size of the second screen display portion 22, what is displayed thereon may be handled in the same manner as what is displayed on the screen display portion 21.

Figure 3:
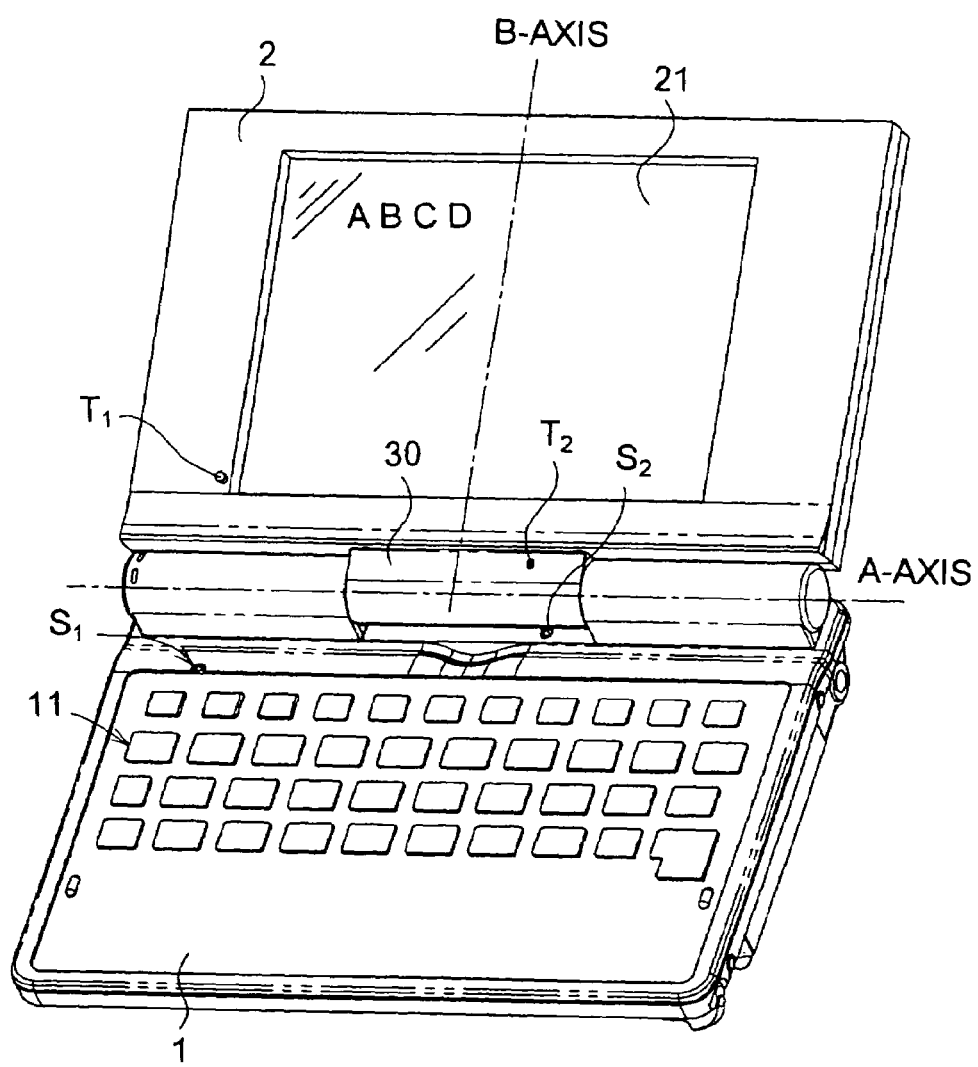
FIG. 3 is a perspective view showing an example of how the appliance appears in the first state.

FIG. 3 is a perspective view showing how the appliance appears in a first state in which the second casing 2 is unfolded relative to the first casing 1 with the screen display portion 21 pointing in the direction of the input portion 11. The state of the appliance can be changed from the out-of-use state shown in FIG. 1 to this state by rotating the second casing 2 about the A-axis (folding shaft) of the two-axis hinge mechanism 3. The input portion 11 is provided on the top face of the first casing 1. On the upper left-hand side of the input portion 11, there is provided a tact switch (detector) $S_1$, which is turned on and off by a projection (detector) $T_1$ formed on the lower left-hand side of the screen display portion 21 provided on the second casing 2. Thus, the tact switch $S_1$ detects the state of the appliance, as will be described later. Moreover, the upper side of the first casing 1 and the lower side of the second casing 2 are coupled together with the two-axis hinge mechanism 3. On the surface of a hinge cover 30 of this two-axis hinge mechanism 3, there is formed a projection (detector) $T_2$, and, in a position that is pressed by the projection $T_2$ when the second casing 2 is folded up, there is provided a tact switch (detector) $S_2$. Thus, like the tact switch $S_1$, the tact switch $S_2$ also detects the state of the appliance. Moreover, in a right-hand portion of the rear face of the first casing 1, there are provided a jog dial 12a, a seesaw-type key top 12b, and a single key top 12c (collectively, operated members 12, shown in FIG. 5). In the appliance shown in FIG. 3, the input portion 11 is shown as realized with a keyboard. However, in the invention, it is possible to use any conventionally known type of input portion other than that, such as a touch panel, track ball, track pad, or pointing stick.

In this first state, the user can perform input via the input portion 11, and the input signals are displayed on the screen display portion 21. When the user performs input with the appliance held in both hands, since the operated members 12 are located in a portion of the rear face of the first casing 1 located within the reach of the fingers of the right hand, the user may perform input, decision, and other operations by use of those operated members 12, as necessary. The operated members 12 play a central role in performing selection/decision operations when the appliance is brought into a second state.

Figure 4:
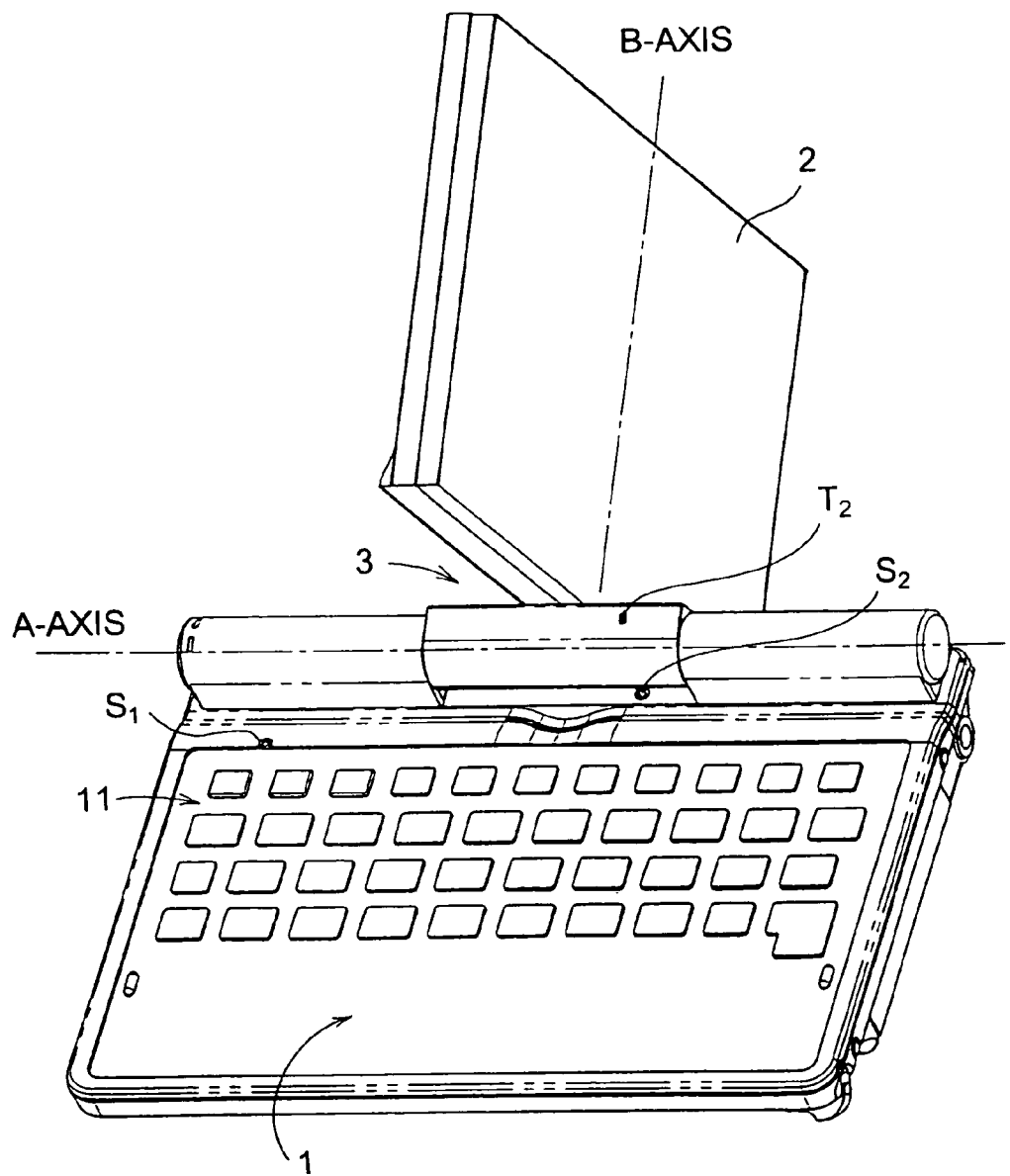
FIG. 4 is a perspective view showing how the state of the appliance is changed from the first to the second state.
Figure 5:
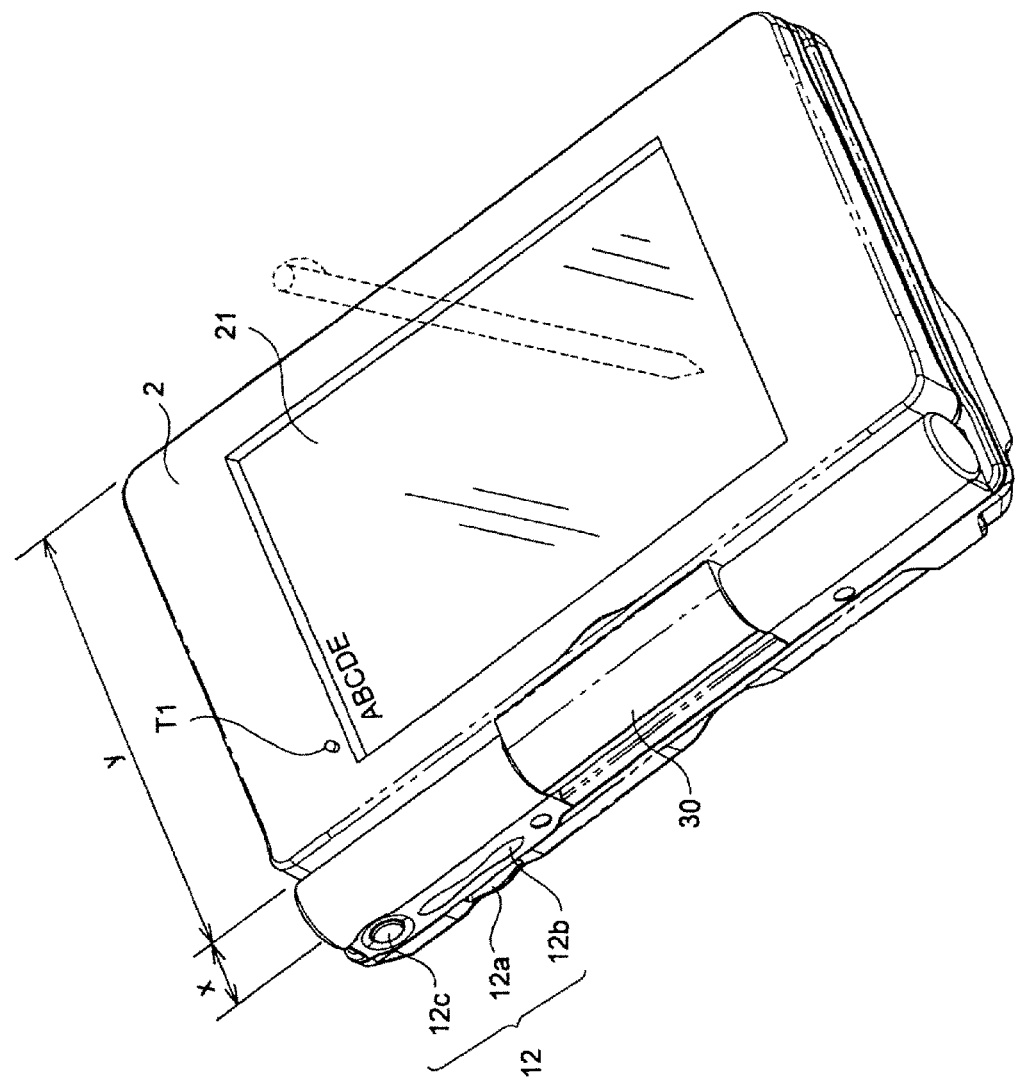
FIG. 5 is a perspective view showing an example of how the appliance appears in the second state.

Next, when selection/decision operations are performed, the appliance is brought into a second state in which the second casing 2 is folded over the first casing 1 with the screen display portion 21 facing outward. Specifically, the state of the appliance can be changed from the state shown in FIG. 3, where the second casing 2 is unfolded, into this state by first rotating the second casing 2 by 180° about the B-axis (rotation shaft) of the two-axis hinge mechanism 3 as shown in FIG. 4 and then rotating the second casing 2 about the A-axis until it is folded over the first casing 1 (second state). Then, the appliance as a whole is rotated by 90°, so that the appliance is used in a longitudinally elongate orientation. Here, to suit the direction from which the appliance is used, the display displayed on the screen display portion 21 is rotated by 90° relative to that displayed in the first state. This permits the user to recognize characters and the like with the appliance in the a longitudinally elongate orientation. FIG. 5 shows a perspective view showing how the appliance appears in the second state.

When the appliance is used in the longitudinally elongate orientation as shown in FIG. 5, it is held snugly in the user's palm, and is far easier to use than when used in the laterally elongate orientation. Here, in consideration of the size of the palm of an adult user, it is preferable that the first casing, which is rectangular in shape, measure 70 to 100 mm in the direction of its shorter sides and 110 to 150 mm in the direction of its longer sides. Moreover, in consideration of the relationship between the rotational moment applied to the second casing and the mechanical strength of the coupling, it is preferable that the ratio x:y (shown in FIG. 5) of the dimension of the coupling to the dimension of the second casing in the direction of the shorter sides thereof as seen in a plan view in the second state be in the range from 1:5 to 1:8, and more preferably in the range from 1:6 to 1:7. Moreover, it is also important that, as seen in a plan view in the second state, the second casing 2 and the hinge mechanism 3 be located within the area occupied by the first casing 1. This helps enhance the operability and portability of the appliance. It is particularly preferable that, as seen in a plan view in the second state, the second casing 2 and the hinge mechanism 3 fit close together without interstices between them so as to completely cover the area occupied by the first casing 1.

Moreover, as shown in FIG. 5, as the direction from which the appliance is used is changed, the display displayed on the screen display portion 21 is rotated by 90° relative to that displayed in the first state so as to permit the user to recognize characters and the like with the appliance in the longitudinally elongate orientation. FIGS. 6A to 6D show examples of display on the screen display portion 21. FIG. 6A shows an example of screen display of horizontally running characters displayed when the appliance is in the laterally elongate orientation (first state). When the appliance is rotated by 90° clockwise from this state so as to be used in the longitudinally elongate orientation (second state), the screen display is rotated by 90° counter-clockwise. This causes display as shown in FIG. 6B to be displayed on the screen display portion 21, and thus permits the user to view the characters in the right orientation.

FIGS. 6C and 6D are examples of screen display of vertically running characters displayed when the appliance is in the laterally and longitudinally elongate orientations, respectively. In a case where characters run vertically, in the same manner as described above, when the appliance is rotated by 90° clockwise from the laterally elongate orientation so as to be used in the longitudinally elongate orientation, the screen display is rotated by 90° counter-clockwise so that the characters are displayed on the screen display portion so as to permit the user to view them in the right orientation. The screen display portion 21 has different widths between the first and second states, and therefore, for effective use of the display area of the screen display portion 21, it is recommended that, as illustrated in FIGS. 6A to 6D, carriage returns or the like be executed at appropriate positions to suit the actual width of the screen display portion 21.

On the other hand, the user may prefer not to rotate the display on the screen display portion 21 even when the direction from which to use the appliance is changed depending on the situation in which the user uses the appliance. To cope with this, a rotation inhibition input portion for inhibiting the 90° rotation of screen display may additionally be provided. As the rotation inhibition input portion, for example, a setting screen as shown in FIG. 7 is prepared to permit the user to inhibit via this screen the rotation of the display on the screen display portion. Alternatively, as the rotation inhibition input portion, a switch may be provided in an appropriate position in the appliance to permit the user to inhibit the rotation of display by turning the switch on or off.

As shown in FIG. 5, when the appliance is used in the longitudinally elongate orientation, in an upper portion of the left-hand side face thereof are located the jog dial 12a, seesaw-type key top 12b, and single key top 12c (collectively, the operated members 12). These operated members 12 are so located as to be operated mainly by the thumb of the user's left hand when the appliance is held in the left hand. The jog dial 12a is used, for example, to move a marker (cursor) up and down across a menu screen to select a desired choice among those displayed thereon. The seesaw-type key top 12b has two parts, of which one is used, for example, to "decide on" a choice and the other, for example, to "cancel" a choice. The single key top 12c is used, for example, as a power key. Needless to say, input operations may be performed via a transparent touch panel fitted on the screen display portion 21 with a finger or by use of a pen, or input by use of the operated members 12 and input with a finger or by use of a pen may be combined.

When the appliance is in the first state, the operated members 12 are located in a right-hand end portion of the rear side of the first casing 1, and therefore, while input is performed via the keyboard in the first state, the operated members 12 may be operated with the right hand to perform functions similar to those described above. As the operated members 12, it is possible to provide any conventionally known type of pointing device or the like other than those mentioned above, such as a track ball, track pad, or pointing stick. The operated members 12 may be assigned different functions between the first and second states.

In the second state shown in FIG. 5, when input is being performed via the screen display portion 21 by use of a pen or with touches, or when the appliance is being held in a hand, the pressing forces exerted in such situations may deform the second casing 2 and thereby cause it to touch the keys of the input portion 11 located just beneath the second casing 2. This leads to erroneous input. To prevent such erroneous input, when the appliance is in the second state, it is preferable to ignore the input signals from at least part of the input portion 11. Here, the part of the input portion 11 denotes that part thereof which is located just beneath the part of the second casing that bends easily. Where this part of the input portion 11 is actually located differs from one appliance to another, but, in general, it corresponds to that part of the input portion 11 which is located in an edge portion of the first casing 1 and away from the coupling. Needless to say, to completely prevent such erroneous input as described above, it is advisable to ignore all input via the input portion 11 when the appliance is in the second state.

Next, how a change in the state of the appliance between the first and second states is detected will be described. As a detector, any conventionally known type may be used, such as a push switch, a combination of a light-emitting and a light-receiving device, or a hole device. The detector may be fitted anywhere so long as it can detect a change in the state between the first and second states. For example, the detector may be placed in a position where it detects that the appliance is in the first or second state, or in a position where it detects that the state of the appliance is in the middle of changing between the first and second states.

Figure 8:
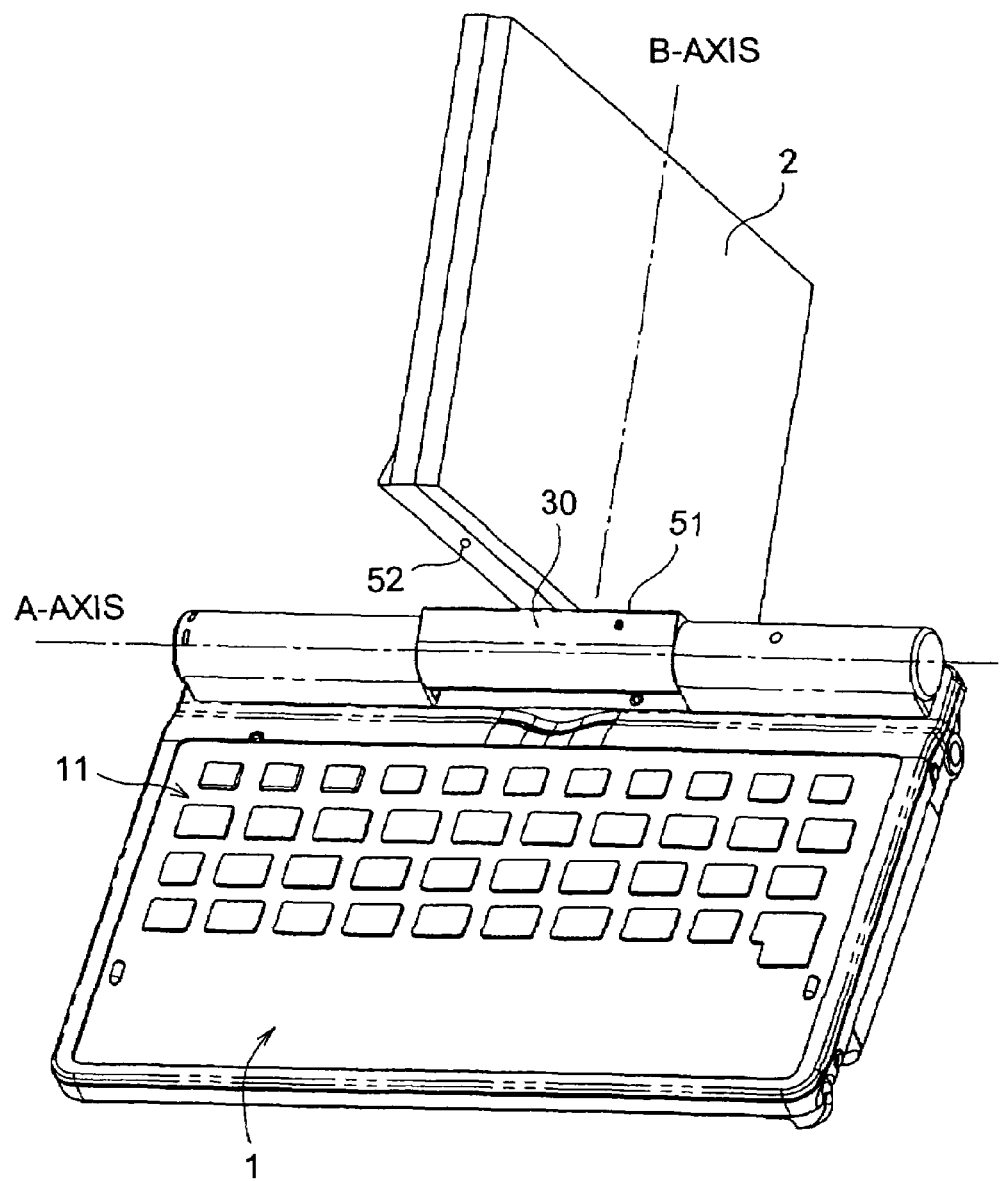
FIG. 8 is a perspective view showing an example of the detector used in the present invention.

FIG. 8 shows one example of how an appliance embodying the invention is fitted with a detector. In the appliance shown in FIG. 8, a light-receiving device 52 is provided on the bottom face of the second casing 2, on one side of the B-axis, and a light-emitting device 51 is provided on the face of the hinge cover 30 that faces the bottom face of the second casing 2. When the appliance is in the first state, the light from the light-emitting device 51 is detected by the light-receiving device 52. However, when the second casing 2 is rotated about the B-axis, the light-receiving device 52 moves away from the position where it faces the light-emitting device 51, and thus the light from the light-emitting device 51 ceases to be detected by the light-receiving device 52. In this way, it is possible to detect, according to whether the light-receiving device 52 detects light or not, whether the second casing 2 is in the first state or not (in the second state).

In another non-illustrated example in which an appliance is fitted with, as a detector, a combination of a light-emitting device and a light-receiving device, both the light-emitting and light-receiving devices 51 and 52 are provided on one of the bottom surface of the second casing 2 or on the hinge cover 30, and a reflective member is provided on the other. In this example also, as in the example described above, it is possible to detect, according to whether the light-receiving device 52 detects light or not, whether the second casing 2 is in the first state or not (in the second state). Specifically, while, when the appliance is in the first state, the light from the emitting-emitting device is reflected from the reflective member and is detected by the light-receiving device, when the second casing is rotated about the rotation shaft, the light from the light-emitting device is not reflected from the reflective member and thus is not detected by the light-receiving device. In these examples, the display on the screen display portion is rotated when the second casing is rotated about the B-axis out of or into the first state.

Figure 9:
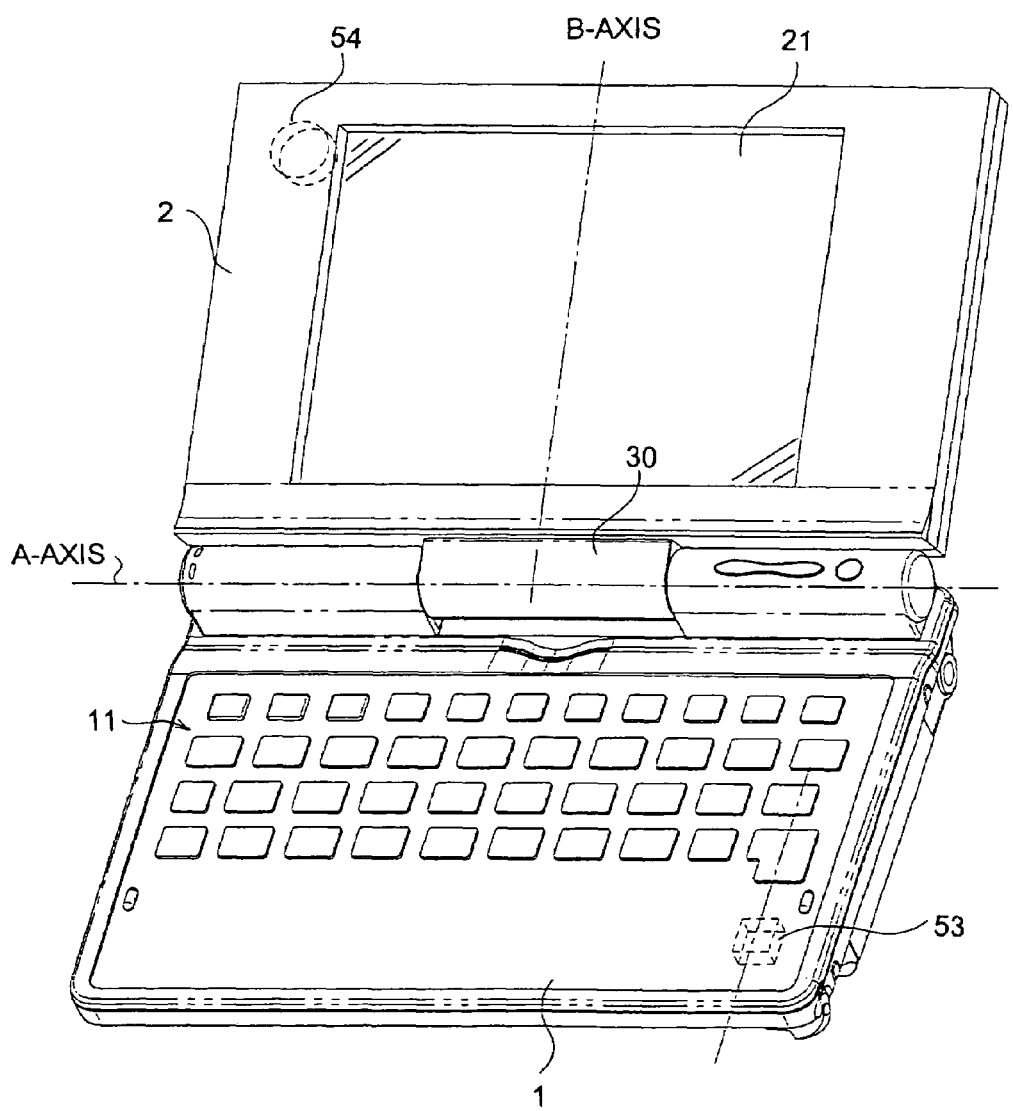
FIG. 9 is a perspective view showing another example of the detector used in the present invention.

FIG. 9 shows another example of how an appliance embodying the invention is fitted with a detector. In the appliance shown in FIG. 9, in a lower right-hand portion of the first casing 1 as seen in the figure, a hole device 53 is embedded, and, in an upper left-hand portion of the second casing 2, a hole device 54, which forms a pair with the hole device 53, is embedded. When these hole devices 53 and 54 come close together, they generate a signal. Accordingly, when the appliance is in the first state as shown in FIG. 9, no detection signal is generated. However, when the second casing 2 is rotated by 180° about the B-axis from the state shown in FIG. 9, and is then rotated about the A-axis so that the second casing 2 is folded over the first casing 1 and is thereby brought into the second state, the hole devices 53 and 54 are so located as to face one another, and thus generate a detection signal. Accordingly, in this appliance, the display on the screen display portion 21 is rotated when the second casing 2 is rotated about the A-axis out of or into the second state.

In a case as described above where whether the appliance is in the second state or not is detected with a detector, as opposed to in the examples described earlier, even when the screen display portion 21 is rotated about the B-axis to a desired angle, the screen display is not rotated. For example, in the state shown in FIG. 10, the screen display portion 21 has been rotated by 180° so as to point away from the input portion 11. This capability can be used to present information or a commercial message to a third party with the screen display portion 21 pointing toward the third party while the user is performing input via the input portion.

All the examples described above use only one detector. Needless to say, an appliance may be fitted with two or more detectors. In that case, it is preferable to detect not only a change in the state of the appliance but also whether the appliance is in a not-in-use state or not so that, if it is in the not-in-use state, the screen display portion is turned off. Now, an example of an apparatus fitted with two detectors will be described.

In the appliance shown in FIG. 3, as described earlier, tact switches $S_1$ and $S_2$ are provided on the first casing 1, on the upper left-hand side of the input portion 11 and in a position facing the hinge cover 30, respectively, and projections $T_1$ and $T_2$ are formed in the corresponding positions by the side of the screen display portion 21 on the second casing 2 and on the hinge cover 30, respectively. FIGS. 11A to 11C are side sectional views along a plane that cuts the tact switch $S_1$, and FIGS. 12A to 12C are side sectional views along a plane that cuts the tact switch $S_2$. The tact switches and projections may be provided in any other positions than specifically described above; however, it is preferable to provide a detector in a position on the first casing facing the hinge cover 30 (where the first and second casings are coupled together) because this position is inconspicuous to the user and permits the tact switch $S_2$ to be pressed by the surface of the hinge cover 30 even if no projection is formed thereon.

As shown in FIG. 11A, when the first and second casings 1 and 2 are folded together with the input portion 11 facing the screen display portion 21 (in the not-in-use state), the tact switch $S_1$ has its pin pressed by the projection $T_1$, and thus the detection signal it produces is in an "on" state. When the second casing 2 is rotated about the A-axis from this not-in-use state, the pin of the tact switch $S_1$ is released from the pressure applied by the projection $T_1$, and thus the tact switch $S_1$ is brought into an "off" state (FIG. 11B). As shown in FIG. 11C, also in the second state, in which the second casing 2 is folded over the first casing 1 with the screen display portion 21 facing outward, the pin of the tact switch $S_1$ is not pressed, and thus the tact switch $S_1$ remains in the "off" state.

On the other hand, as shown in FIG. 12A, when the first and second casings 1 and 2 are folded together, the tact switch $S_2$ has its pin pressed by the projection $T_2$, and thus the tact switch $S_2$ is "on." When the second casing 2 is unfolded by being rotated about the A-axis, as shown in FIG. 12B, the pin of the tact switch $S_2$ is released from the pressure applied by the projection $T_2$. This permits the pin to move upward, and thereby turns the tact switch $S_2$ from "on" to "off." As shown in FIG. 12C, also when the appliance is in the second state, the pin is not pressed, and thus the tact switch $S_2$ is in the "on" state. Table 1 shows an overview of the relationship between the detection signals generated by the tact switches $S_1$ and $S_2$ and the state of the appliance.

As shown in Table 1, when the appliance is in the not-in-use state, the tact switches $S_1$ and $S_2$ are both "on"; when the appliance is in the first state, the tact switches $S_1$ and $S_2$ are both "off"; when the appliance is in the second state, the tact switch $S_1$ is "off" and the tact switch $S_2$ is "on." In this way, according to the detection signals generated by the detectors $S_1$ and $S_2$, it is possible to detect not only whether the appliance is in the first or second state but also whether the appliance is in the not-in-use state or not.

Preferably, this is exploited to turn on and off the screen display portion 21 and switch the modes of screen display as shown in Table 1. Specifically, when the appliance is brought from the not-in-use state to the first state, the screen display portion 21 is automatically turned on, and, when the appliance is brought from the first state to the second state, the screen display displayed on the screen display portion 21 is rotated by 90° relative to that displayed in the first state. Reversely, when the appliance is brought from the second state to the first state, the screen display is rotated by 90° in the opposite direction, and, when the appliance is brought from the first state to the not-in-use state, the screen display portion 21 is automatically turned off. As modifications of this control, when the appliance is brought into the not-in-use state, only the backlight of the screen display may be turned off, or the power to the appliance may be turned off, or, in the case of a PDA with communication capabilities, application programs other than those relating to the communication capabilities may be stopped. This helps reduce unnecessary power consumption and thereby save energy.

Figure 13A:
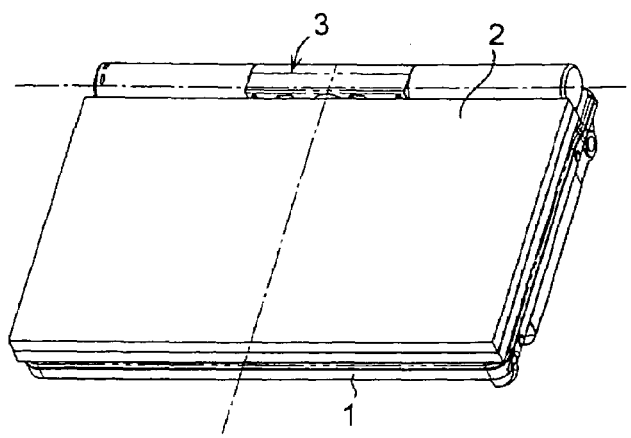
FIGS. 13A to 13C are diagrams showing different modes in which the electronic appliance shown in FIG. 1 can be used.
Figure 13B:
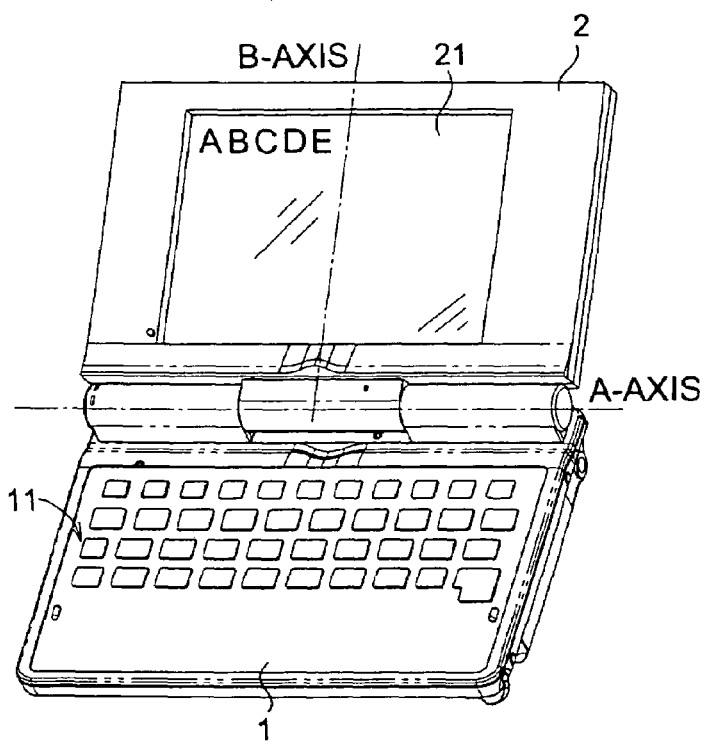
Figure 13C:
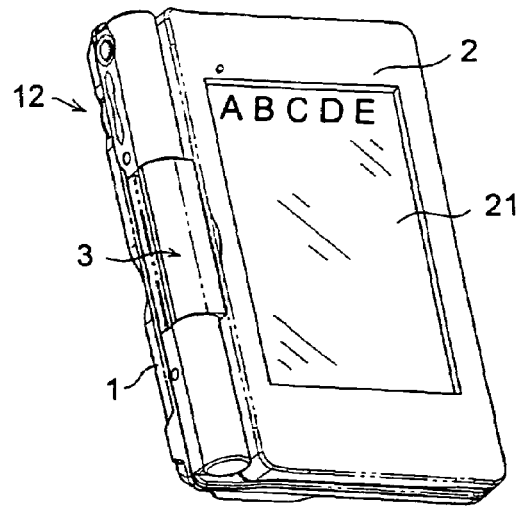

Next, an electronic appliance embodying the invention which achieves the second object will be described. FIGS. 13A, 13B, and 13C show the three states in which the electronic appliance shown in FIGS. 1 to 5 is used. As described earlier, this electronic appliance is a portable data processing appliance wherein a first casing 1 provided with a key operation portion 11 and a second casing 2 provided with a screen display portion 21 are coupled together by a coupling (two-axis hinge mechanism) 3, with the second casing 2 rotatable by approximately 180° about the A-axis and by 180° about the B-axis relative to the first casing 1. Needless to say, the second casing 2 may be made rotatable by approximately 360° about the A-axis relative to the first casing 1; the second casing 2 may be made rotatable by 360° in one direction about the B-axis, or rotatable by 180° in both directions, i.e., clockwise and counter-clockwise, about the B-axis so as to be rotatable by 360° in total.

Figure 14:
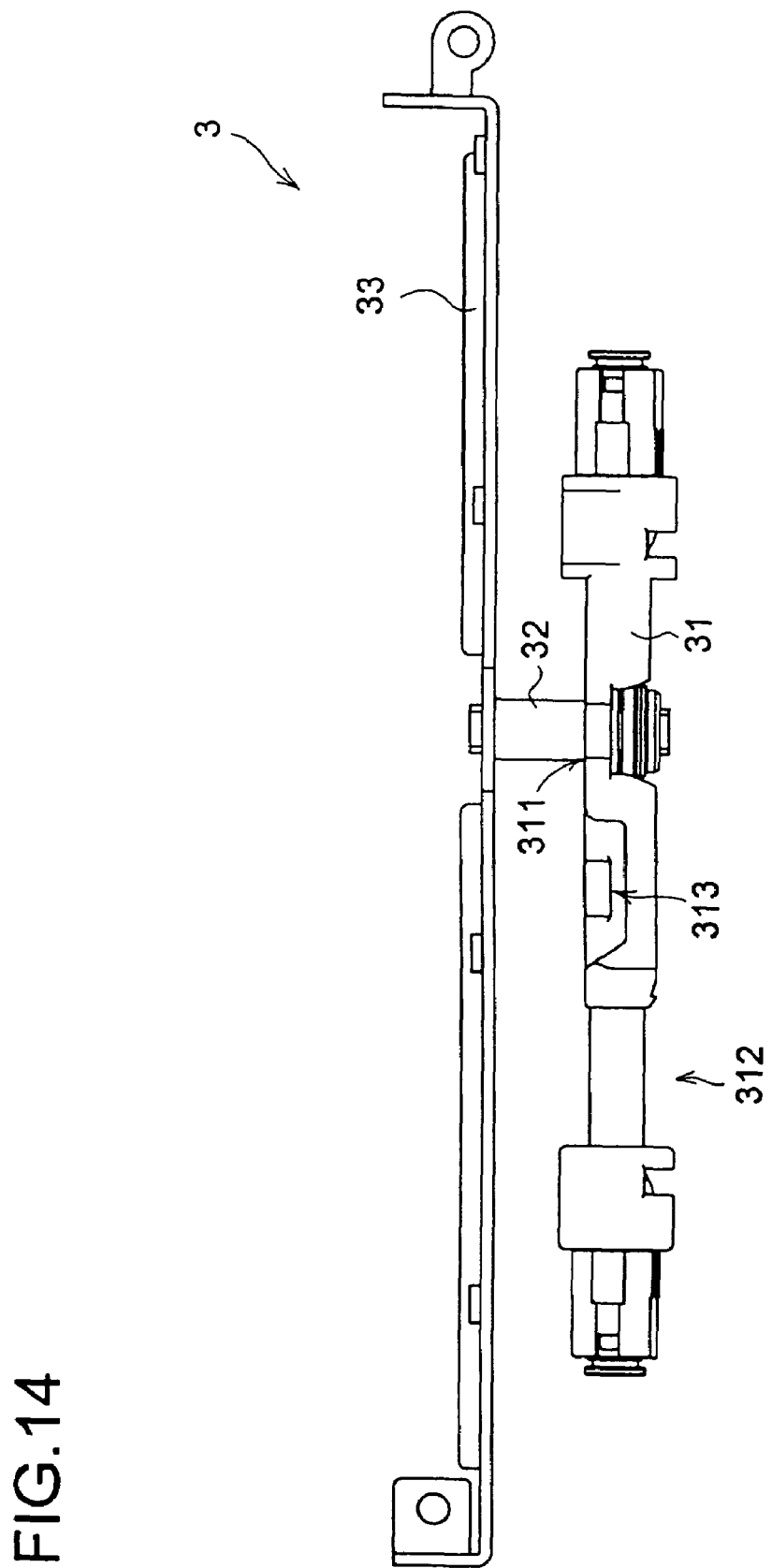
FIG. 14 is a front view showing an example of the two-axis hinge mechanism used in the invention.

FIG. 14 is a front view of the two-axis hinge mechanism 3 used in the electronic appliance shown in FIG. 13. The two-axis hinge mechanism 3 shown in FIG. 14 has a folding shaft 31 and a rotation shaft 32. In a position slightly deviated from the middle of the folding shaft 31 on the right-hand side thereof, there is formed a through hole 311, into which one end of the rotation shaft 32 is rotatably fitted. On the left-hand side of the middle of the folding shaft 31, there is formed a winding portion 312 with a smaller diameter around which to wind FPC boards (not illustrated). Between the through hole 311 and the winding portion 312, there is formed a groove 313 in which to lay the FPC boards along the shaft. This groove 313 also serves to absorb the looseness of the FPC boards that occurs as the casing is rotated. On the other hand, as described above, one end of the rotation shaft 32 is fitted into the folding shaft 31. The other end of the rotation shaft 32 is fitted to a frame 33. The rotation force applied to the second casing 2 is transmitted via this frame 23 to the two-axis hinge mechanism. In this two-axis hinge mechanism, since the distance between the frame 33 and the folding shaft 31 is short, no smaller-diameter portion or groove is formed in the rotation shaft 32. Needless to say, in a case where the distance between the frame 33 and the folding shaft 31 is long, a smaller-diameter portion around which to wind the FPC boards and a groove through which to lay the FPC boards along the shaft, like those formed in the folding shaft 31, may be formed in the rotation shaft 32.

Figure 15:
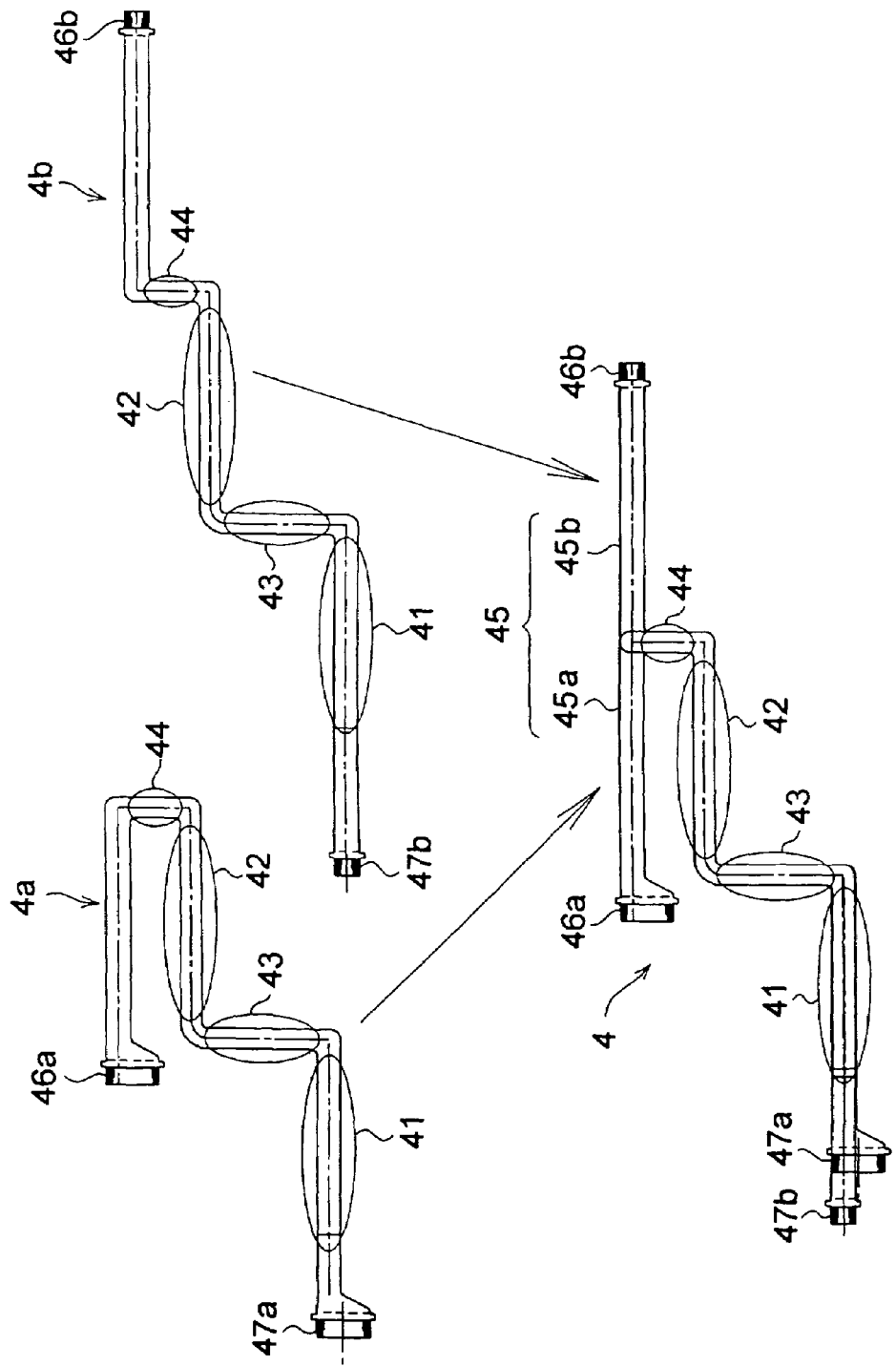
FIG. 15 is a plan view showing an example of the FPC boards.

FIG. 15 shows an example of the FPC boards used in an electronic appliance embodying the invention. The FPC boards 4 shown in FIG. 15 is composed of two FPC boards 4a and 4b laid on each other with parts thereof bonded together. In the FPC boards 4 laid together, a first wound portion 41 to be wound around the folding shaft 31 runs parallel to a second wound portion 42 to be wound around the rotation shaft 32. A middle portion 43 runs downward from the left-hand end of the second wound portion 42 and links to the right-hand end of the first wound portion 41. Thus, the portion starting with the first wound portion 41 and ending with the second wound portion 42 is crank-shaped as a whole. On the other hand, a vertical portion 44 runs vertically upward from the right-hand end of the second wound portion 42, and, at the upper end of the vertical portion 44, a horizontal portion 45 runs horizontally rightward and leftward. At both ends of the horizontal portion 45, there are formed connection portions 46a and 46b for connection to the circuit wiring (not illustrated) inside the second casing. The left-hand portion of the first wound portion 41 extends further leftward, and, at the left-hand end thereof, there are formed connection portions 47a and 47b for connection to the circuit wiring (not illustrated) inside the first casing.

The FPC boards may be given any shape so long as they can be wound around the folding and rotation shafts and laid along those shafts. The shape of the FPC boards is determined appropriately to suit the structure of the two-axis hinge mechanism and the shapes of the shafts. In a case where a smaller two-axis hinge mechanism is used, it is preferable that the FPC boards be so shaped as to have a first wound portion 41 and a second wound portion 42 laid parallel to each other with one ends of the first and second wound portions 41 and 42 linked together with a straight middle portion 43.

Figure 16:
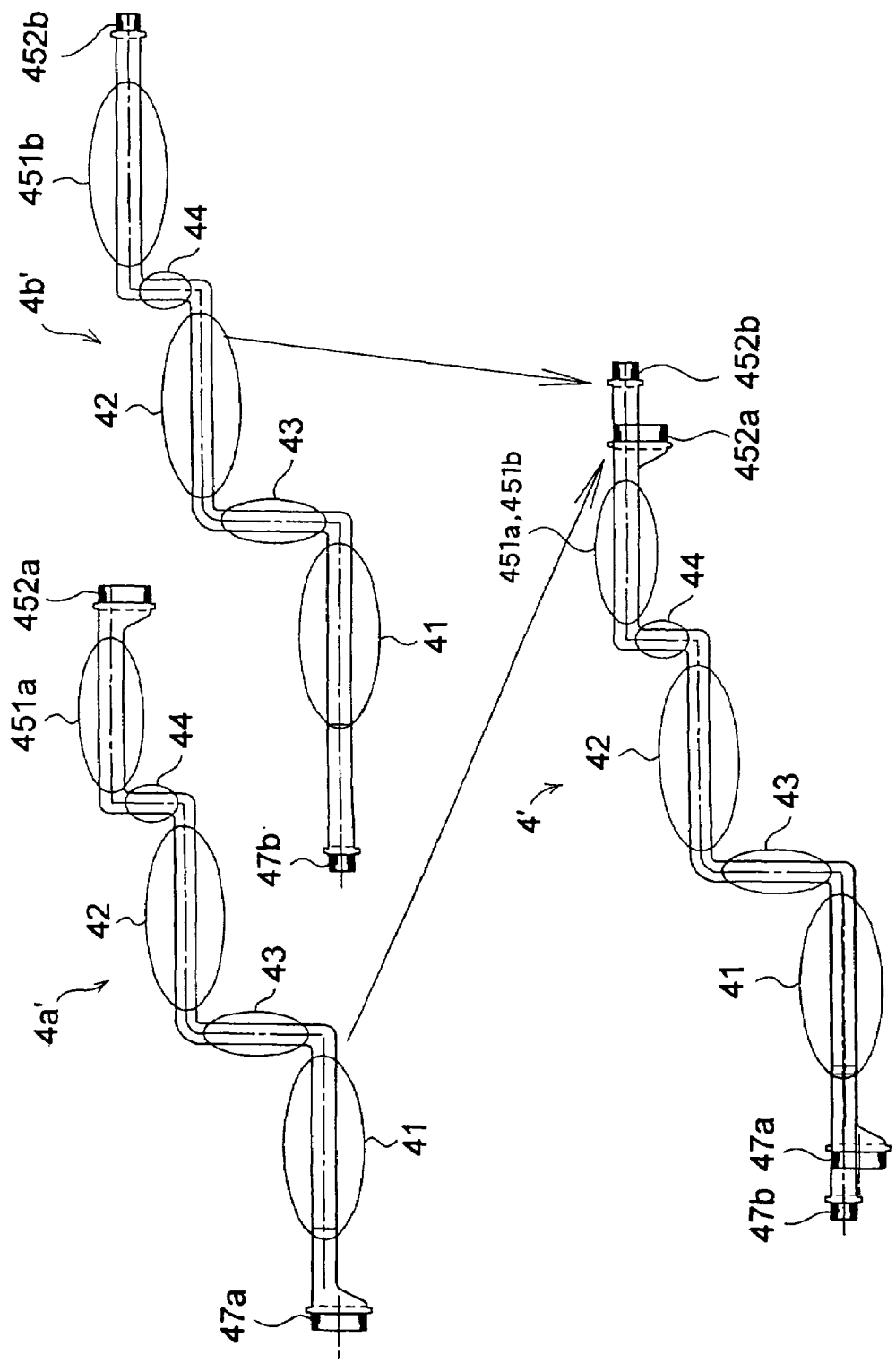
FIG. 16 is a plan view showing another example of the FPC boards.

The FPC boards shown in FIG. 15 are composed of two FPC boards laid on each other. This is to increase the number of leads without increasing the width of the FPC boards. Accordingly, in a case where only a small number of leads are used relative to the width of the FPC boards, a single FPC board may be used. On the other hand, in a case where a large number of leads are used, an increased number of FPC boards may be laid on one another. It should be noted, however, that, in a case where a plurality of FPC boards are used, they need to be laid on one another in such a way that the portions thereof (41 and 42 in FIG. 15) that are wound around the folding and rotation shafts and the portions thereof (43) that are laid along those shafts overlap completely. By contrast, the other portions of the FPC boards than those mentioned above need not overlap, but may be extended in desired directions so as to be conveniently connected to their respective wiring destinations inside the electronic appliance. With the FPC boards shown in FIG. 15, in which the connection portions 46a and 46b are so formed as to point away from each other by 180°, it is possible to effectively use the space inside the appliance and thereby make the appliance compact. In this case, the horizontal portions 45a and 45b need not necessarily be formed to run from the upper end of the vertical portion 44 to form a single line, but may be formed in such a way as to have the connection portions in horizontally deviated positions. On the other hand, as shown in FIG. 16, the horizontal portions 451a and 451b may be formed to run in the same direction (in the figure, rightward) so that the connection portions 452a and 452b are located in the same direction. This helps concentrate the circuit wiring in one place inside the appliance. In this case, the horizontal portions 451a and 451b need not overlap, but may be deviated from each other.

Figure 17:
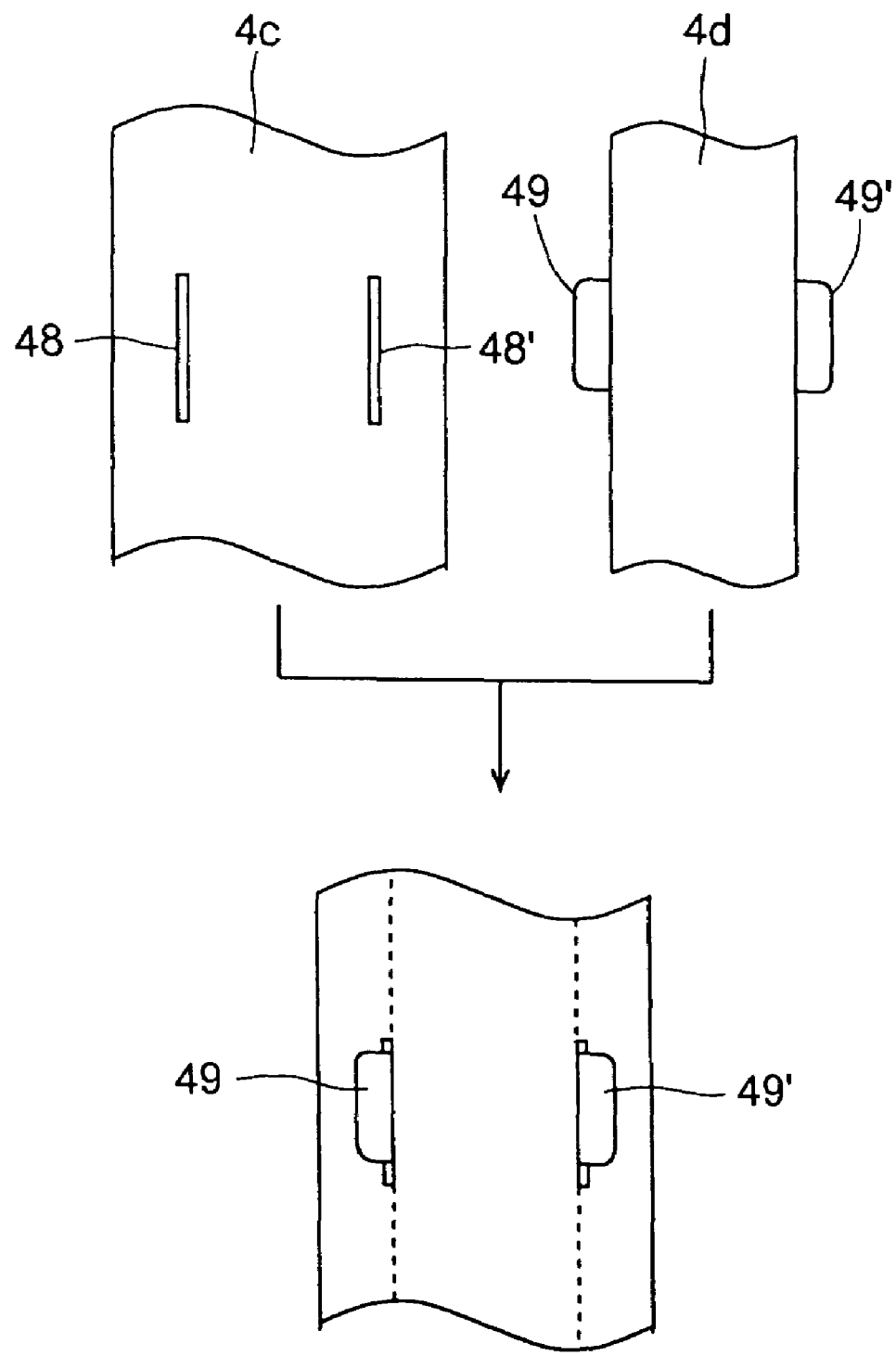
FIG. 17 is a partial plan view showing an example of how the two FPC boards are bundled together.

In a case where a plurality of FPC boards laid on one another are used, at least parts of the FPC boards are bonded together with a bonding member. In a case where, for example, highly flexible FPC boards are used, they may be simply laid together without use of a bonding member. Needless to say, the FPC boards may be bundled together without use of a bonding member. For example, as shown in FIG. 17, two slits 48 and 48' are formed in one FPC board 4c, substantially parallel to the length direction thereof. Moreover, another FPC board 4d is given a width equal to or smaller than the interval between the two slits 48 and 48', and tongue-like protrusions 49 and 49' having a width not greater than the length of the slits are formed at both edges of the FPC board 4d. The two FPC boards 4c and 4d are laid on each other, and the tongue-like protrusions 49 and 49' of the FPC board 4d are inserted into the slits 48 and 48', so that the FPC boards 4c and 4d are bundled together. Here, if the slits 48 and 48b' are given a length greater than the width of the tongue-like protrusions 49 and 49', the FPC board 4d is movable in the length direction relative to the FPC board 4c. This makes it possible to absorb the looseness that results from the differences in inner diameter between the individual FPC boards when they are wound around a shaft.

Figure 18:
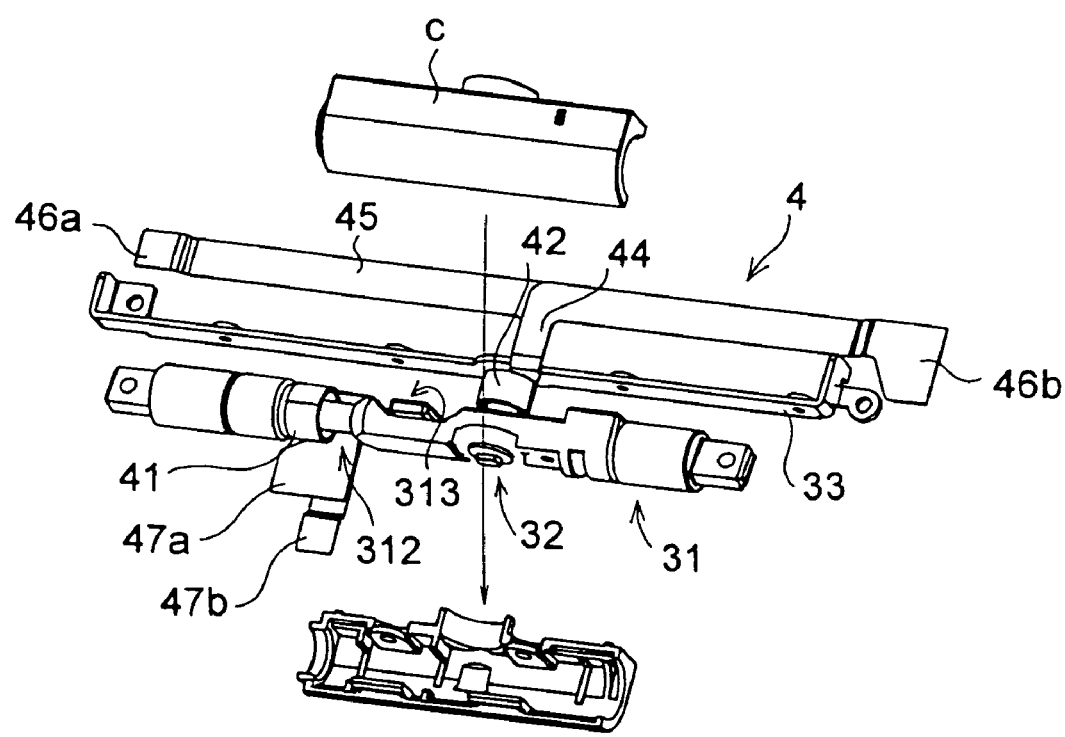
FIG. 18 is a perspective view showing how the FPC boards are assembled into the two-axis hinge mechanism.

FIG. 18 is a perspective view showing the FPC boards 4 shown in FIG. 15 assembled into the two-axis hinge mechanism 3 shown in FIG. 14. The FPC boards 4 are assembled into the two-axis hinge mechanism 3, for example, in the following manner. The connection portions 46a and 46b at both ends of the horizontal portion 45 are connected to the circuit wiring (not illustrated) inside the second casing 2. Next, the bent portion between the vertical portion 44 and the second wound portion 42 of the FPC boards 4 is put on the rotation shaft 32 of the two-axis hinge mechanism, and then the FPC boards 4 are wound 2¾ turns around the rotation shaft 32 in such a way that, after the FPC boards 4 are so wound, the middle portion 43 thereof points right to the folding shaft 31. Next, the middle portion 43 is laid in the groove 313 formed in the folding shaft 31 so that the FPC boards 4 runs along the folding shaft 31. Next, the bent portion between the middle portion 43 and the first wound portion 41 is put on the winding portion 312 of the folding shaft 31, and the FPC boards 4 are wound 2 turns around the winding portion 312. Then, the connection portions 47a and 47b at the end of the FPC boards 4 are connected to the circuit wiring (not illustrated) inside the first casing.

Figure 19:
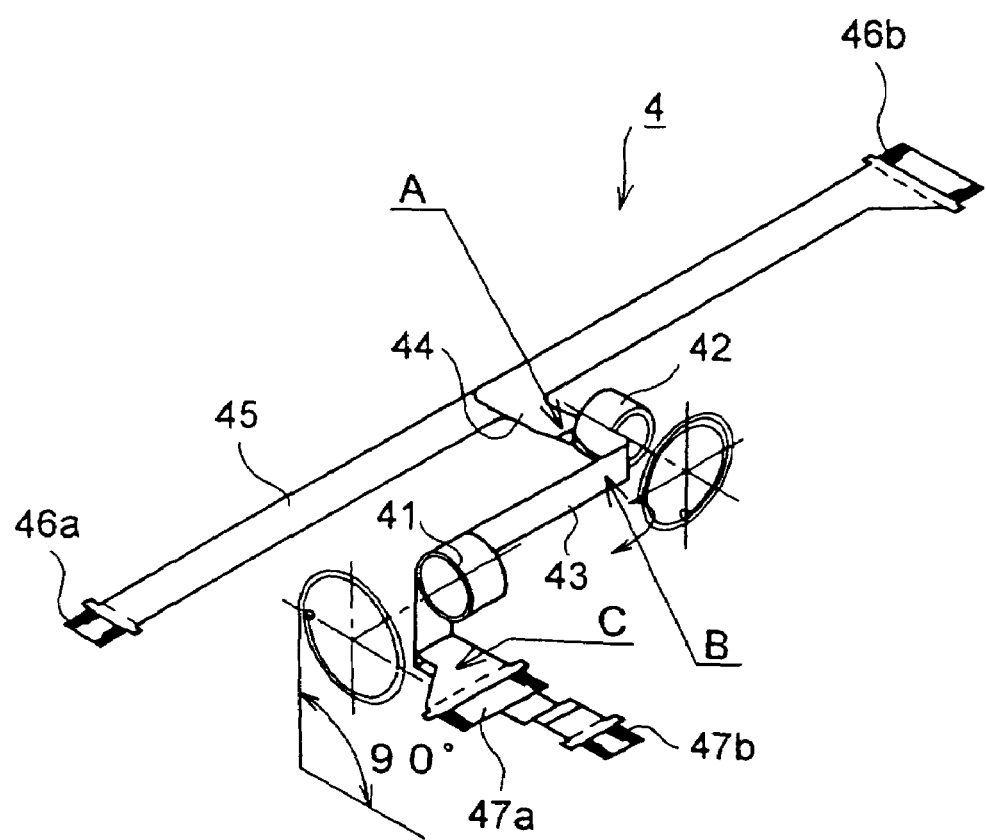
FIG. 19 is a perspective view showing only the FPC boards shown in FIG. 18.
Figure 21A:
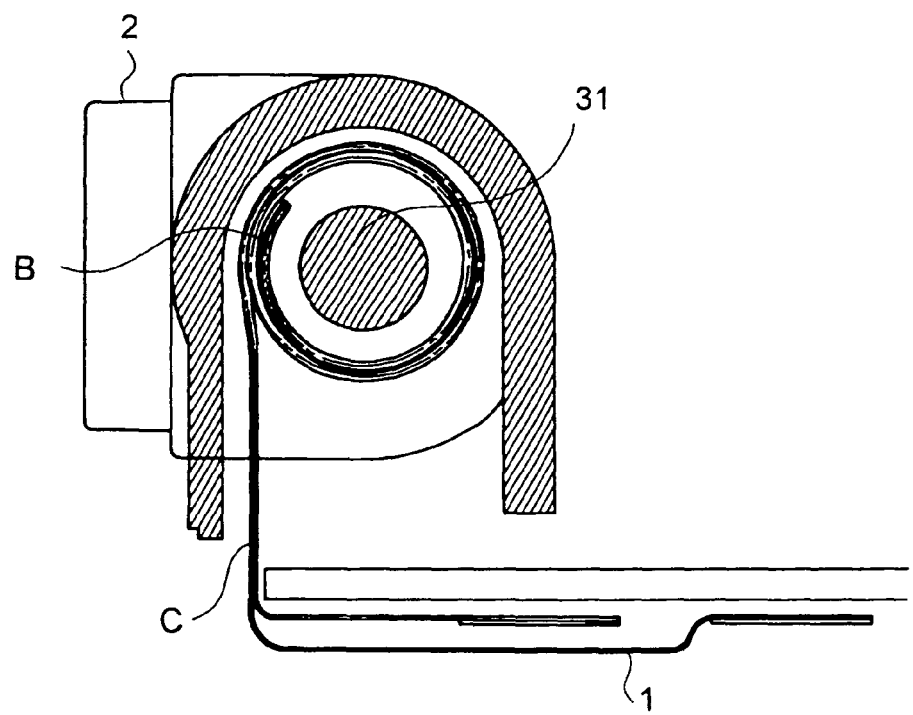
FIGS. 21A and 21B are sectional views of the folding shaft having the FPC boards wound around it as shown in FIG. 19.
Figure 21B:
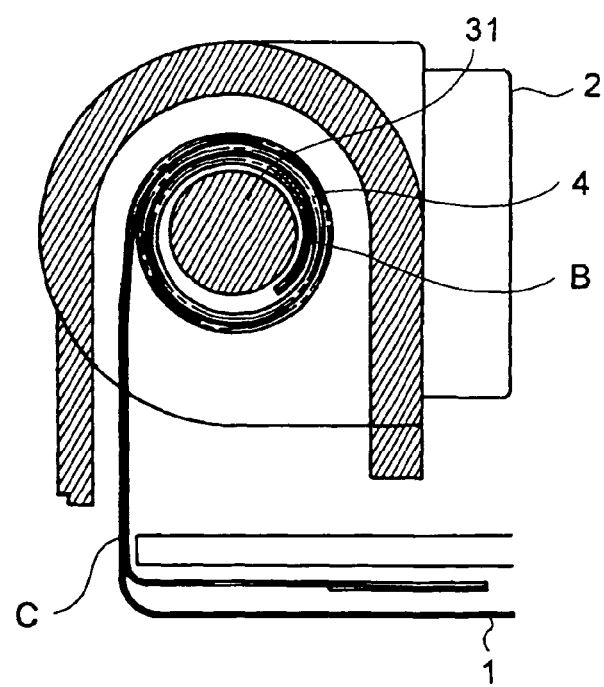

FIG. 19 is a perspective view of the FPC boards when they are in the state shown in FIG. 18. FIGS. 20A and 20B are sectional views of the rotation shaft and FIGS. 21A and 21B are sectional views of the folding shaft, both having the FPC boards wound around them as shown in FIG. 19. FIG. 20A shows a state in which the FPC boards 4 are wound 2¾ turns around the rotation shaft 32. Specifically, the point at which the FPC boards 4 start being wound is indicated by "A" and the point at which they stop being wound is indicated by "B." FIG. 20B shows how the FPC boards 4 are wound around the rotation shaft 32 when, from the state shown in FIG. 20A, the second casing 2 (shown in FIG. 1) is rotated by 180° clockwise relative to the first casing 1 (shown in FIG. 1). As will be clear from these figures, here, as the second casing 2 is rotated by 180° clockwise about the rotation shaft 32, the point "A" at which the FPC boards 4 start being wound also rotates by 180° clockwise, and thus the FPC boards 4 are brought into a state in which they are wound 2¼ turns around the rotation shaft 32.

FIGS. 21A and 21B are sectional views of the folding shaft 31 having the FPC boards 4 wound around it. FIG. 21A shows a state in which the second casing 2 is unfolded relative to the first casing 1. In this state, the FPC boards 4 are wound 2 turns around the folding shaft 31. Specifically, the point at which the FPC boards 4 start being wound is indicated by "B" and the point at which they stop being wound is indicated by "C." FIG. 21B shows how the FPC boards 4 are wound around the folding shaft 31 when, from the state shown in FIG. 21A, the second casing 2 is folded over the first casing 1. Here, as the second casing 2 is rotated by 180° clockwise about the folding shaft 31, the point "B" at which the FPC boards 4 star being wound also rotates by 180°, and thus the FPC boards 4 are brought into a state in which they are wound 2½ turns around the folding shaft 31.

In the electronic appliance shown in FIG. 18, the FPC boards 4 are wound in the shape of a coil. It is, however, also possible to wind them into a spiral shape. To minimize the portion where the FPC boards are wounded, it is preferable to wind them in the shape of a coil. Winding the FPC boards in the space of a coil, as compared with winding them into a spiral shape, helps greatly reduce contact between the side edges of the FPC boards. This helps alleviate contact-induced deterioration of the FPC boards and thereby achieve a long life time.

In this way, in a structure in which the FPC boards are wound around the folding and rotation shafts, folding/unfolding or rotating the second casing relative to the first casing causes only slight changes in the diameters with which the FPC boards are wound around the folding and rotation shafts. This helps make the hinge mechanism compact.

Figure 22:
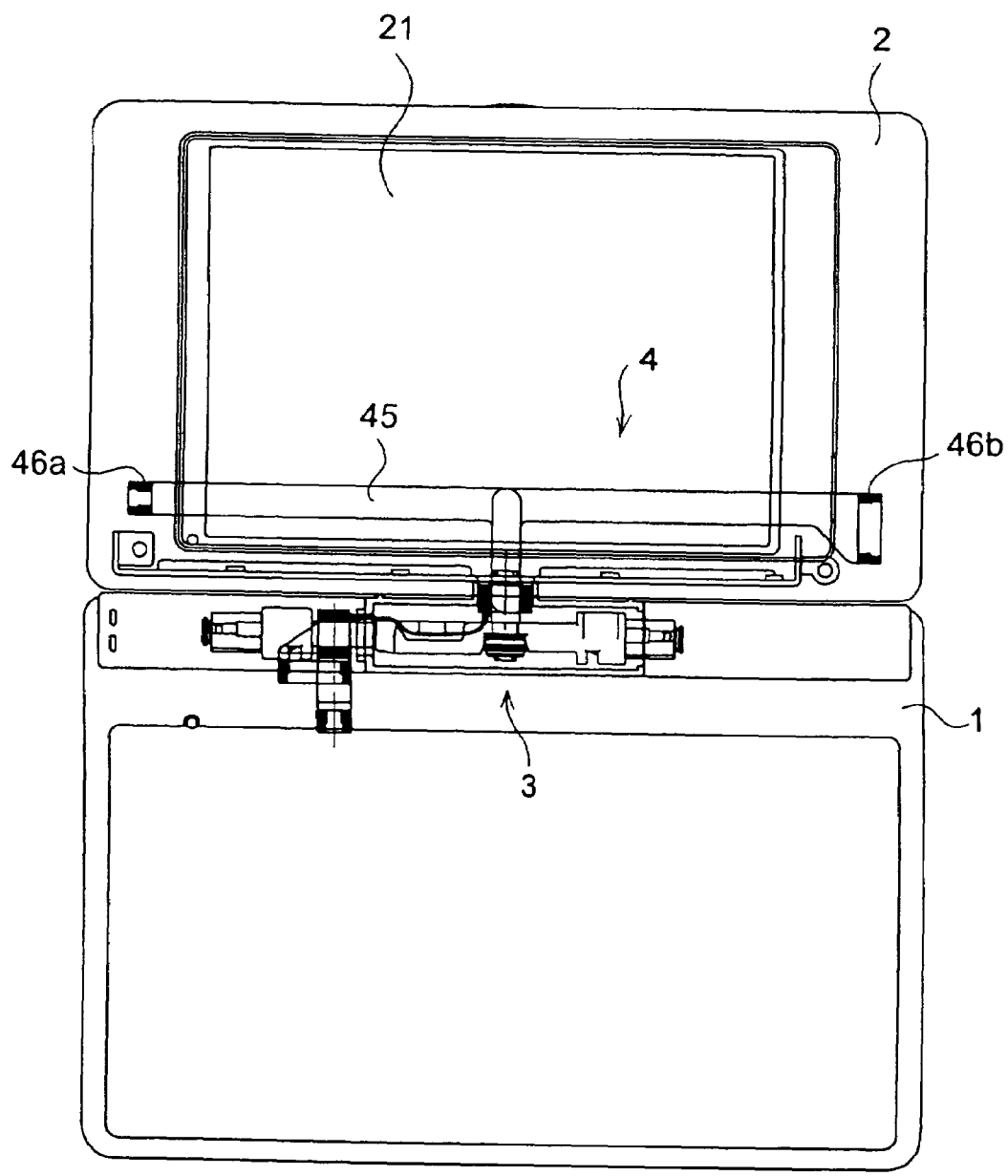
FIG. 22 is a diagram showing how the first and second casings are coupled together by the two-axis hinge mechanism shown in FIG. 18.
Figure 23:
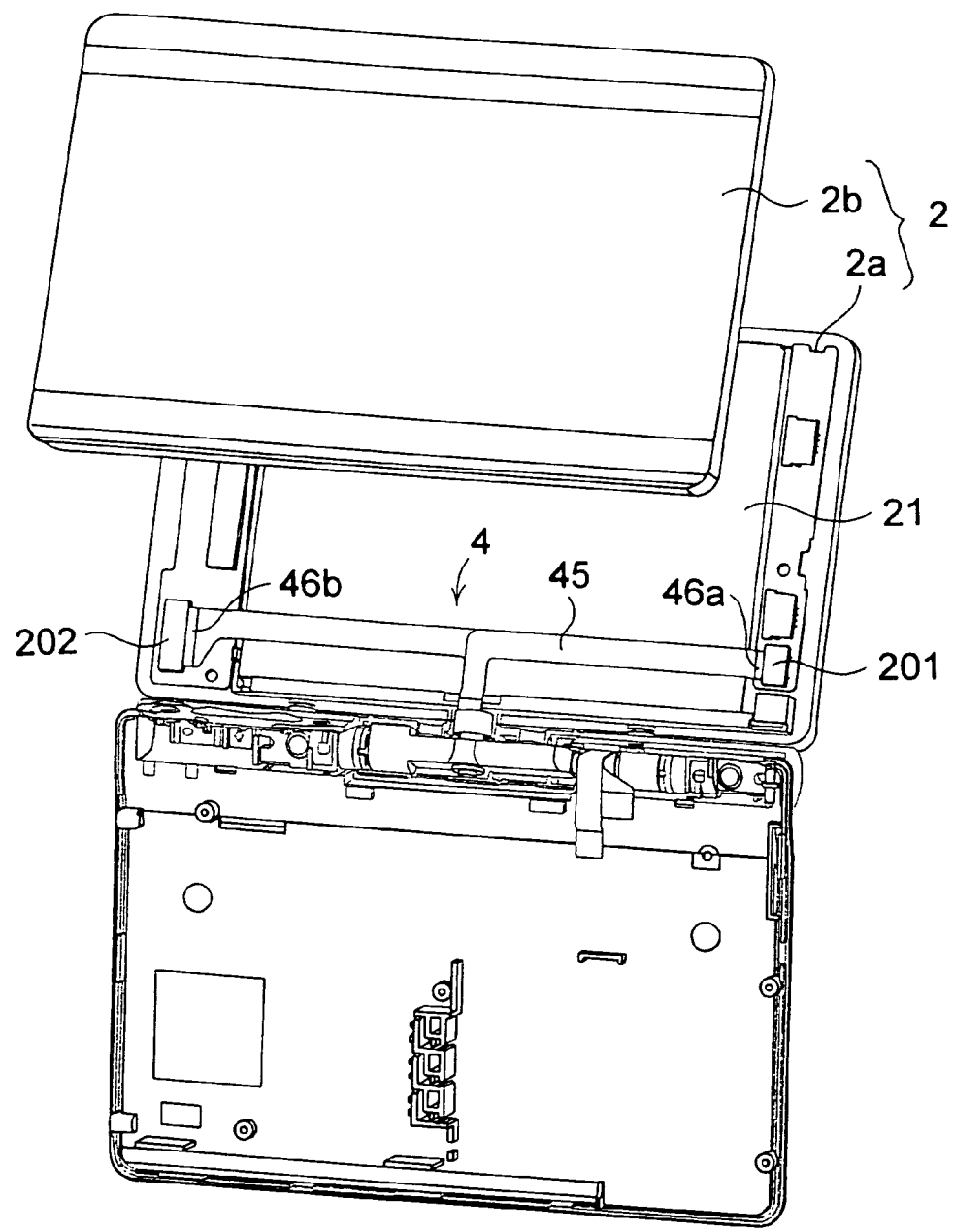
FIG. 23 is a perspective view of the electronic appliance embodying the invention, as seen from the bottom.

FIG. 22 shows how the first and second casings 1 and 2 are coupled together by the two-axis hinge mechanism 3. FIG. 23 is a perspective view of this electronic appliance, as seen from the bottom face. In FIG. 22, the portion of the FPC boards 4 located inside the second casing is laid so as to overlap a lower portion of the screen display portion 21. As will be understood from FIG. 23, first, the screen display portion 21 is mounted on a front member 2a of the second casing 2 so as to show through an opening (not illustrated) formed therein. Next, the horizontal portion 45 of the FPC boards 4 is placed in a lower portion of the rear face of the screen display portion 21, and the connection portions 46a and 46b are connected to connection portions 201 and 202, respectively, of the second casing 2. Then, a rear member 2b of the second casing 2 is fitted to the front member 2a. Conventionally, in a lower portion inside the second casing 2 is secured a dedicated space for connecting and accommodating one ends of the FPC boards, and the screen display portion is arranged above that space. By contrast, in the structure being discussed, laying the FPC boards 4 between the rear face of the screen display portion 21 and the inner surface of the rear member 2b of the second casing 2 eliminates the need for a space for accommodating the FPC boards 4. This permits the screen display portion 21 to be moved toward the hinge mechanism inside the second casing 2. This makes it possible to make the second casing compact.

Next, another electronic appliance embodying the invention will be described. This electronic appliance differs from the one described above in that at least one of the folding and rotation shafts is made hollow so that a flexible connecting member is formed into a spiral shape and laid inside whichever of the folding shaft and rotation shaft is hollow, and is wound around a surface of whichever of the folding shaft and rotation shaft is not hollow.

Figure 24A:
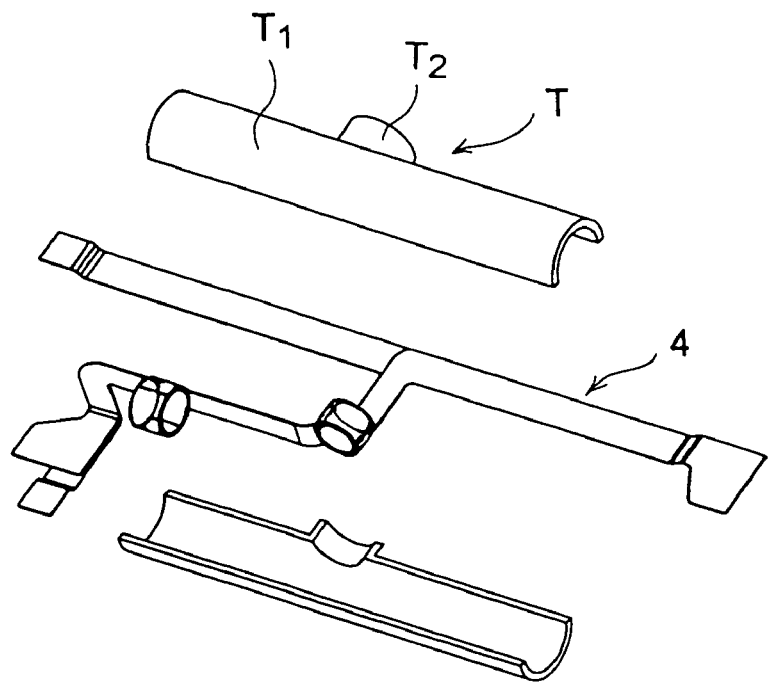
FIGS. 24A and 24B are perspective views showing another example of the two-axis hinge mechanism used in the invention.
Figure 24B:
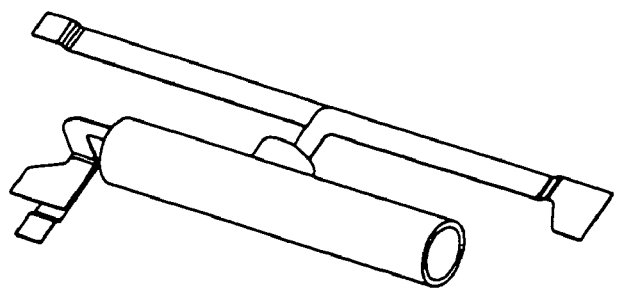

FIGS. 24A and 24B show an example of the hinge mechanism used in this electronic appliance. FIGS. 24A and 24B are perspective views that show an insertion tube T that is inserted inside the folding and rotation shafts, which are both made hollow, along with FPC boards 4 laid inside the insertion tube T. The insertion tube T is composed of a transverse long tube $T_1$ having a short tube $T_2$ connected vertically to the middle thereof, and is cut into two parts along a plane that includes the axes of the long and short tubes $T_1$ and $T_2$, so that the FPC boards 4, of which parts are previously wound into the shape of a coil, are laid inside the insertion tube T (FIG. 24A). Used as the FPC boards 4 here are those shown in FIG. 15. The FPC boards 4 may be wound in any manner, for example into a spiral shape. However, from the viewpoint of minimizing rubbing between the side edges of the FPC boards 4, it is preferable to wind them into the shape of a coil. Next, the two separate parts of the insertion tube T are bonded together, for example, with a bonding member (not illustrated) (FIG.

24B). Then, the insertion tube T is fitted inside the folding and rotation shafts (neither is illustrated), which are made hollow.

With the hinge mechanism structured as described above, just as in the example described earlier, folding/unfolding or rotating the second casing relative to the first casing causes only slight changes in the diameters with which the FPC boards are wound around the folding and rotation shafts. This helps make the hinge mechanism more compact than ever.

In the electronic appliance shown in FIGS. 24A and 24B, both the folding and rotation shafts are made hollow. Needless to say, it is also possible to make only one of those shafts hollow and leave the other solid. In this case, the FPC boards are wound into the shape of a coil and laid inside the hollow shaft, and are would around the solid shaft.

TABLE 1

| Appliance State | Tact Switches $S_1$ | $S_2$ | | Screen Display State |
|---|---|---|---|---|
| Not-in-use State | ON | ON | | OFF |
| First State | OFF | OFF | ON | Rotated by 90° |
| Second State | OFF | ON | ON | |

What is claimed is:

1. An electronic appliance comprising:
a first casing having an input portion, a second casing having a screen display portion on one face thereof, a coupling that couples together the first and second casings, and a controller portion that controls screen display on the screen display portion, wherein
the coupling couples together the first and second casings so that the electronic appliance can be moved between a first state, in which the second casing is unfolded relative to the first casing with the screen display portion pointing in a direction of the input portion, and a second state, in which the second casing is folded over the first casing with a face of the second casing opposite to the screen display portion facing a face of the first casing on which the input portion is provided, and
according to a detection signal from a detector that detects a change in the state of the electronic appliance between the first and second states, the controller portion rotates the screen display by 90° between the first and second states,
wherein the second casing has a second screen display portion provided on the surface thereof opposite to the screen display portion.

2. The electronic appliance according to claim 1, wherein the coupling is a hinge mechanism comprising a folding shaft that couples together one side of the first casing and one side of the second casing in such a way as to permit the second casing to be folded and unfolded relative to the first casing and a rotation shaft that is perpendicular to the folding shaft and that permits the second casing to rotate.

3. The electronic appliance according to claim 1, wherein in the second state, the second casing and the coupling are located within an area occupied by the first casing.

4. The electronic appliance according to claim 1, further comprising:
a rotation inhibition input portion that inhibits the screen display from being rotated by 90°.

5. The electronic appliance according to claim 1, wherein, in the second state, input signals from at least part of the input portion are ignored.

6. The electronic appliance according to claim 1, wherein the screen display portion is rectangular in shape, and carriage returns in contents of the screen display are executed at different positions for the first and second states according to a height and a width of the screen display portion that vary between the first and second states.

7. The electronic appliance according to claim 1, wherein the detector detects the second state.

8. The electronic appliance according to claim 1, wherein a change in the state of the electronic appliance is detected by use of two or more detectors, and a not-in-use state is also detected, in which the second casing is folded over the first casing with the face of the second casing on which the screen display portion is provided facing the face of the first casing on which the input portion is provided, and
in the not-in-use state, the screen display portion is turned off.

9. The electronic appliance according to claim 1, wherein at least one of the detectors is provided where the first and second casings are coupled together.

10. The electronic appliance according to claim 1, wherein at least one of the detectors is realized with a hole device.

11. The electronic appliance according to claim 3, wherein the first casing is rectangular in shape, and measures from about 70 to about 100 mm in a direction of shorter sides thereof and from about 110 to about 150 mm in a direction of longer sides thereof.

12. The electronic appliance according to claim 5, wherein, in the second state, input signals from a part of the input portion located in an edge portion of the first casing and away from the coupling are ignored.

13. The electronic appliance according to claim 11, wherein a ratio of a dimension of the coupling to a dimension of the second casing in the direction of the shorter sides is in a range of from 1:5 to 1:8.

14. An electronic appliance comprising:
a first casing having an input portion, a second casing having a screen display portion on one face thereof, a coupling that couples together the first and second casings, and a controller portion that controls screen display on the screen display portion, wherein
the coupling couples together the first and second casings so that the electronic appliance can be moved between a first state, in which the second casing is unfolded relative to the first casing with the screen display portion pointing in a direction of the input portion, and a second state, in which the second casing is folded over the first casing with a face of the second casing opposite to the screen display portion facing a face of the first casing on which the input portion is provided, and
according to a detection signal from a detector that detects a change in the state of the electronic appliance between the first and second states, the controller portion rotates the screen display by 90° between the first and second states, wherein
an operation portion that permits operations to be performed to control contents of the screen display is provided in a right portion of a rear face of the first casing as seen from in front when the electronic appliance is in the first state, and
when the state of the electronic appliance is changed from the first state to the second state, the screen display is rotated counter-clockwise by 90° as seen from the coupling, and the operation portion is located in an upper portion of a left side face of the electronic appliance when the electronic appliance is used in the second state.

15. A method of using an electronic appliance, comprising the step of:
presenting information to a third party by using an electronic appliance that includes a first casing having an input portion, a second casing having a screen display portion on one face thereof, a coupling that couples together the first and second casings, and a controller portion that controls screen display on the screen display portion, wherein
the coupling couples together the first and second casings so that the electronic appliance can be moved between a first state, in which the second casing is unfolded relative to the first casing with the screen display portion pointing in a direction of the input portion, and a second state, in which the second casing is folded over the first casing with a face of the second casing opposite to the screen display portion facing a face of the first casing on which the input portion is provided, and
according to a detection signal from a detector that detects a change in the state of the electronic appliance between the first and second states, the controller portion rotates the screen display by 90° between the first and second states, so that the screen display portion is rotated from the first state, in which the screen display portion points in the direction of the input portion, into a direction in which the face of the second casing opposite to the screen display portion points in the direction of the input portion so that the screen display portion points toward the third party.

16. An electronic appliance comprising:
a first casing, a second casing, a coupling that couples together the first and second casings, and a flexible connecting member that electrically connects together the first and second casings, wherein
the coupling is a two-axis hinge mechanism comprising a folding shaft that permits the second casing to be folded and unfolded relative to the first casing and a rotation shaft that is perpendicular to the folding shaft and that permits the second casing to rotate, and
the flexible connecting member is wound around surfaces of both the folding shaft and rotation shaft.

17. The electronic appliance according to claim 16, wherein, in at least one of the folding shaft and rotation shaft, a groove is formed through which to lay the flexible connecting member along the shaft.

18. The electronic appliance according to claim 16, wherein the flexible connecting member includes a portion shaped so that a first wound portion wound around the folding shaft and a second wound portion wound around the rotation shaft are laid substantially parallel to each other, with one end of the first wound portion and one end of the second wound being linked together with a straight middle portion.

19. The electronic appliance according to claim 16, wherein the flexible connecting member is a flexible printed circuit board.

20. The electronic appliance according to claim 16, wherein, as the flexible connecting member, two or more flexible connecting members are laid on one another.

21. The electronic appliance according to claim 16, wherein a screen display portion is provided on at least one face of the second casing, and a portion of the flexible connecting member located inside the second casing is laid between a rear face of the screen display portion and an inner face of the second casing.

22. The electronic appliance according to claim 20, wherein at least one end of the two or more flexible connecting members are laid so as to point in a same direction.

23. The electronic appliance according to claim 20, wherein at least one end of the two or more flexible connecting members are laid so as to point in opposite directions.

24. The electronic appliance according to claim 20, wherein two slits are formed in one flexible connecting member and two tongue-like protrusions not greater than the slits are formed on another flexible connecting member so that the flexible connecting members are bundled together with the tongue-like protrusions inserted in the slits.

25. An electronic appliance comprising:
a first casing, a second casing, a coupling that couples together the first and second casings, and a flexible connecting member that electrically connects together the first and second casings, wherein
the coupling is a two-axis hinge mechanism comprising a folding shaft that permits the second casing to be folded and unfolded relative to the first casing and a rotation shaft that is perpendicular to the folding shaft and that permits the second casing to rotate, at least one of the folding shaft and rotation shaft being made hollow, and
the flexible connecting member is formed into a coil-like shape and laid inside whichever of the folding shaft and rotation shaft is hollow, and is wound around a surface of whichever of the folding shaft and rotation shaft is not hollow.

26. The electronic appliance according to claim 25, wherein the flexible connecting member is a flexible printed circuit board.

27. The electronic appliance according to claim 25, wherein, as the flexible connecting member, two or more flexible connecting members are laid on one another.

28. The electronic appliance according to claim 25, wherein a screen display portion is provided on at least one face of the second casing, and a portion of the flexible connecting member located inside the second casing is laid between a rear face of the screen display portion and an inner face of the second casing.

29. The electronic appliance according to claim 27, wherein at least one end of the two or more flexible connecting members are laid so as to point in a same direction.

30. The electronic appliance according to claim 27, wherein at least one end of the two or more flexible connecting members are laid so as to point in opposite directions.

31. The electronic appliance according to claim 27, wherein two slits are formed in one flexible connecting member and two tongue-like protrusions not greater than the slits are formed on another flexible connecting member so that the flexible connecting members are bundled together with the tongue-like protrusions inserted in the slits.

* * * * *